(12) United States Patent
Fujiwara et al.

(10) Patent No.: US 10,841,444 B2
(45) Date of Patent: Nov. 17, 2020

(54) IMAGE READING APPARATUS

(71) Applicant: Brother Kogyo Kabushiki Kaisha, Nagoya (JP)

(72) Inventors: Takashi Fujiwara, Nagakute (JP); Kazutoshi Nakamura, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/261,671

(22) Filed: Jan. 30, 2019

(65) Prior Publication Data
US 2019/0238698 A1  Aug. 1, 2019

(30) Foreign Application Priority Data
Jan. 31, 2018  (JP) .................................. 2018-014263

(51) Int. Cl.
*H04N 1/00* (2006.01)

(52) U.S. Cl.
CPC ..... *H04N 1/00604* (2013.01); *H04N 1/00588* (2013.01); *H04N 1/00591* (2013.01); *H04N 1/00615* (2013.01); *H04N 1/00798* (2013.01)

(58) Field of Classification Search
CPC .......... H04N 1/00604; H04N 1/00615; H04N 1/00588; H04N 1/00591; H04N 1/00798
USPC ...................................................... 358/1.15
See application file for complete search history.

(56) References Cited

U.S. PATENT DOCUMENTS

| | | | |
|---|---|---|---|
| 4,629,173 A * | 12/1986 | Hashimoto | B65H 15/00 271/186 |
| 10,341,516 B2 * | 7/2019 | Imaki | B65H 3/0669 |

FOREIGN PATENT DOCUMENTS

| | | |
|---|---|---|
| JP | H10-167545 | 6/1998 |
| JP | 2005-008283 A | 1/2005 |

* cited by examiner

*Primary Examiner* — Tammy Paige Goddard
*Assistant Examiner* — Darryl V Dottin
(74) *Attorney, Agent, or Firm* — Banner & Witcoff, Ltd.

(57) ABSTRACT

An image reading apparatus includes: a supply tray, which supports sheets to be supplied and includes a movable plate configured to move from a first position to a second position as the sheet supported by the supply tray is decreased, the second position being higher than the first position; a discharge tray; a conveyance guide; a reading sensor; a discharge unit, which includes a discharge opening to discharge the sheet conveyed by the conveyance guide to the discharge tray and is configured to move from a third position to a fourth position as the sheet supported by the paper feed tray is decreased, the fourth position being higher than the third position; and a first drive source, which generates a drive force, wherein the discharge unit is configured to move by receiving the drive force and to transmit the drive force to the movable plate.

12 Claims, 16 Drawing Sheets

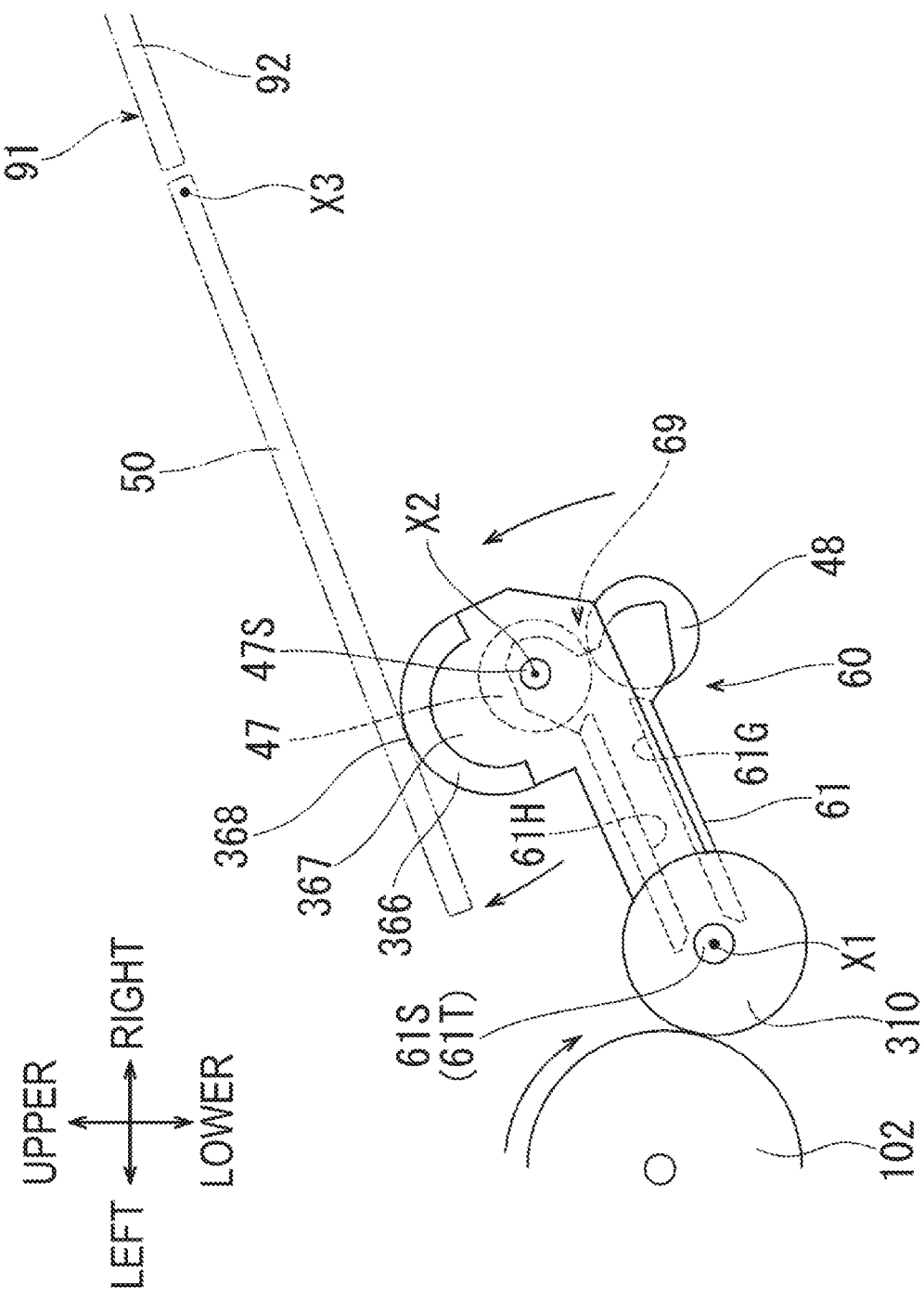

IMAGE READING APPARATUS

CROSS-REFERENCE TO RELATED APPLICATION

This application claims priority from Japanese Patent Application No. 2018-014263 filed on Jan. 31, 2018, the entire subject matter of which is incorporated herein by reference.

TECHNICAL FIELD

This disclosure relates to an image reading apparatus.

BACKGROUND

The background art discloses a document feeding device being an example of image reading apparatuses according to the background art. The document feeding device is provided with a paper feed tray, a paper discharge tray and a conveyance guide. The paper feed tray supports a supplied document. The paper discharge tray is positioned below the paper feed tray and supports the document to be discharged. The conveyance guide conveys the document from the paper feed tray to the paper discharge tray. In the middle of the conveyance guide, an image reading position for reading an image on the document to be conveyed on the conveyance guide is set.

The paper feed tray moves upward as sheets supported by the paper feed tray is decreased and approaches a document pickup unit. The document feeding device further includes a swing conveyance unit. The swing conveyance unit includes a discharge opening to discharge the document conveyed by the conveyance guide to the paper discharge tray. The swing conveyance unit moves upward as the sheet supported by the paper feed tray is decreased, thereby separating the discharge opening from the paper discharge tray. Specifically, a link member is installed between the paper feed tray and the swing conveyance unit, and the swing conveyance unit ascends and descends according to the ascent and descent of the paper feed tray. In this manner, the document feeding device is designed to achieve miniaturization in the up and down direction.

SUMMARY

Meanwhile, an image reading apparatus including the same configuration as that of the document feeding device described above is assumed. The image reading apparatus is provided with a supply tray including a movable body and a discharge unit. The discharge unit includes a discharge opening to discharge a sheet to a discharge tray. A link member is installed between a movable plate of the supply tray and the discharge unit. The discharge unit ascends and descends according to the ascent and descent of the movable plate of the supply tray.

However, in the image reading apparatus, since the discharge unit driven by the movable plate is more likely to cause troubles such as positional displacement and the like than the movable plate, there is a possibility that positional determination accuracy of components of the discharge opening and the discharge unit may deteriorate. As an example of the components of the discharge unit, a discharge roller, a discharge pinch roller, a discharge guide for guiding the sheet to the discharge opening and the like are described. Therefore, a path length of a conveyance guide varies according to the movement of the movable plate and the discharge unit and there is a possibility that a conveyance speed of the sheet conveyed on the conveyance guide may become unstable. As a result, reading accuracy of a reading sensor may deteriorate in the image reading apparatus.

This disclosure is to provide an image reading apparatus not only capable of achieving miniaturization in an up and down direction, but also capable of preventing deterioration in reading accuracy of a reading sensor.

An image reading apparatus of this disclosure includes: a supply tray, which supports sheets to be supplied and includes a movable plate configured to move from a first position to a second position as the sheet supported by the paper feed tray is decreased, the second position being higher than the first position, a discharge tray, which is positioned below the supply tray to support the sheet to be discharged; a conveyance guide, which conveys the sheet from the supply tray to the discharge tray; a reading sensor, which reads an image on the sheet to be conveyed on the conveyance guide; a discharge unit, which includes a discharge opening to discharge the sheet conveyed by the conveyance guide to the discharge tray and is configured to move from a third position to a fourth position as the sheet supported by the paper feed tray is decreased, the fourth position being higher than the third position; and a first drive source, which generates a drive force. The discharge unit is configured to move by receiving the drive force from the first drive source and to transmit the drive force from the first drive source to the movable plate.

In the image reading apparatus of this disclosure, it is possible to achieve miniaturization in an up and down direction by a configuration in which the movable plate and the discharge unit move as the sheets supported by the supply tray is decreased.

Further, in the image reading apparatus, the drive force from the first drive source is transmitted to the discharge unit and then the discharge unit moves. Additionally, the drive force from the first drive source is transmitted to the movable plate by the discharge unit and then the movable plate moves. In other words, since the movable plate is driven by the discharge unit, the discharge unit on an upstream side to which the drive force from the first drive source is transmitted is less likely to cause troubles such as positional displacement and the like than the movable plate on a downstream side. Therefore, in the image reading apparatus, it is possible not only to determine positions of components of the discharge opening and the discharge unit with high accuracy, but also to prevent a variation of a path length of the conveyance guide according to the movement of the movable plate and the discharge unit. As a result, a conveyance speed of the sheet conveyed on the conveyance guide hardly becomes unstable.

Therefore, in the image reading apparatus of this disclosure, it is possible not only to achieve the miniaturization in the up and down direction, but also to prevent the deterioration in the reading accuracy of the reading sensor.

BRIEF DESCRIPTION OF THE DRAWINGS

The foregoing and additional features and characteristics of this disclosure will become more apparent from the following detailed descriptions considered with the reference to the accompanying drawings, wherein:

FIG. 16 is a schematic diagram same as that of FIG. 15 and is a diagram illustrating a state in which the movable plate is disposed at a second position and the discharge unit is disposed at a fourth position.

DETAILED INFORMATION

Hereinafter, first and third embodiments in which this disclosure is embodied will be described with reference to the drawings.

First Embodiment

Figure 1:
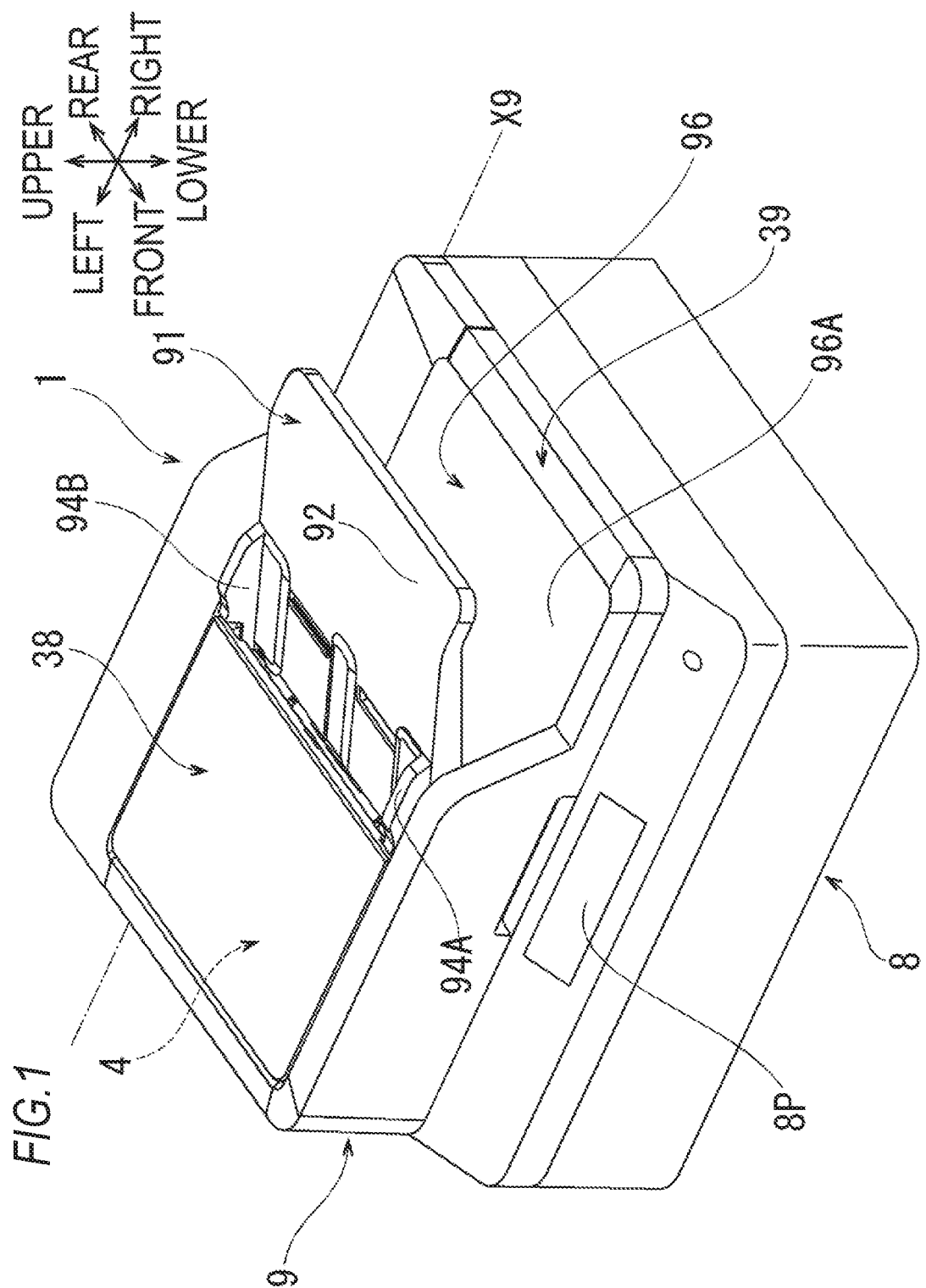
FIG. 1 is a perspective view illustrating an image reading apparatus according to a first embodiment.
Figure 2:
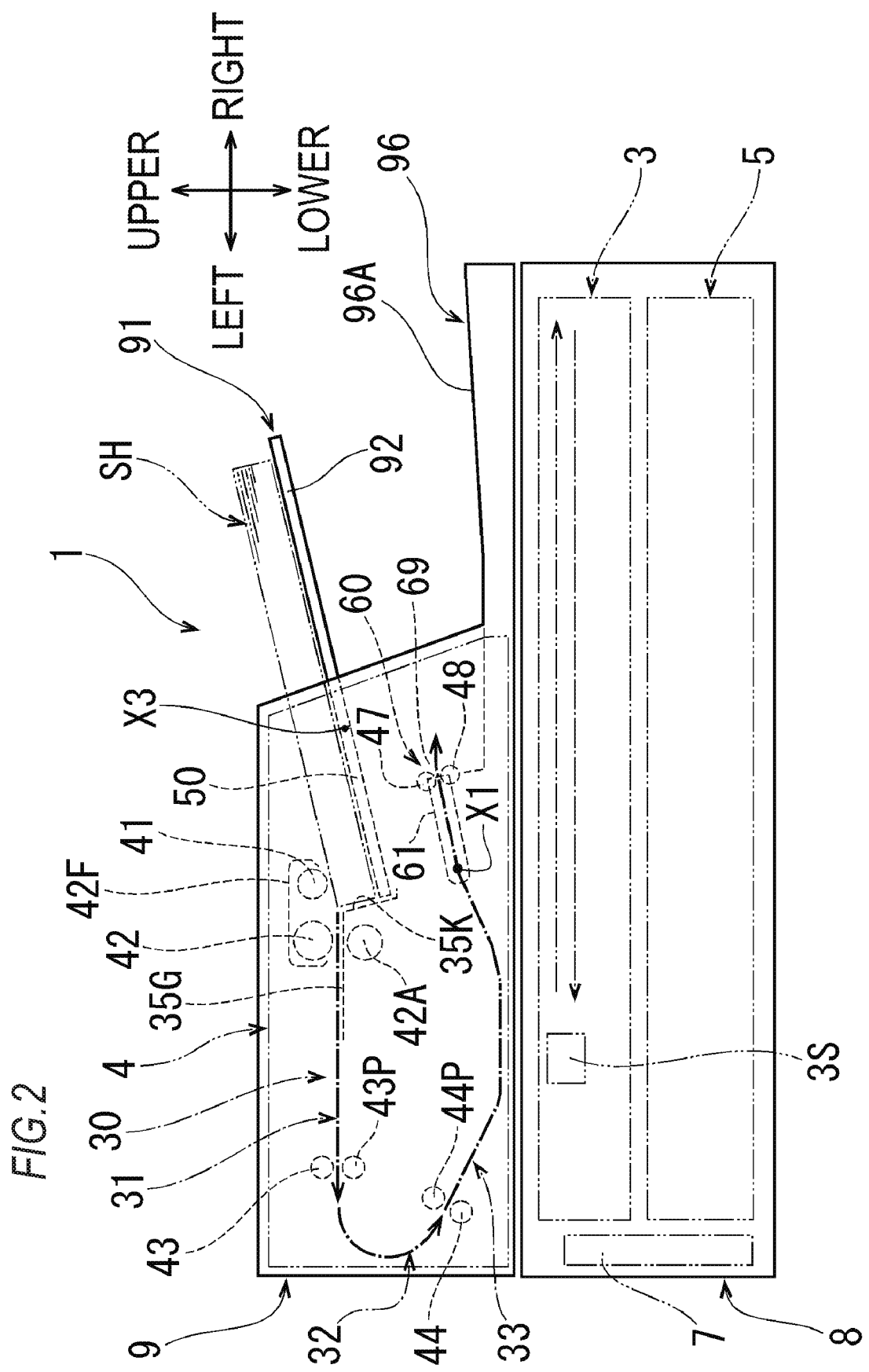
FIG. 2 is a schematic front view illustrating the image reading apparatus according to the first embodiment.

As illustrated in FIG. 1, an image reading apparatus 1 of a first embodiment is an example of a specific aspect of the image reading apparatus of this disclosure. In FIG. 1, a side on which an operation panel 8P is disposed is defined as a front side of a device, and a side which comes to the left when facing the operation panel 8P is defined as a left side, thereby displaying respective directions of front, rear, left, right, upper and lower sides. Then, each direction illustrated in each drawing from FIG. 2 is displayed corresponding to each direction illustrated in FIG. 1. Hereinafter, respective components provided in the image reading apparatus 1 will be described based on FIG. 1 and the like.

<Overall Configuration>

As illustrated in FIGS. 1 to 4, the image reading apparatus 1 includes a main body unit 8, an opening and closing unit 9, an image forming unit 5, a reading unit 3, an automatic conveyance mechanism 4 and a controller 7. The main body unit 8 is an approximately flat box-shaped body. As illustrated in FIG. 1, the operation panel 8P which is a touch panel and the like is provided on a front surface of the main body unit 8.

Figure 5:
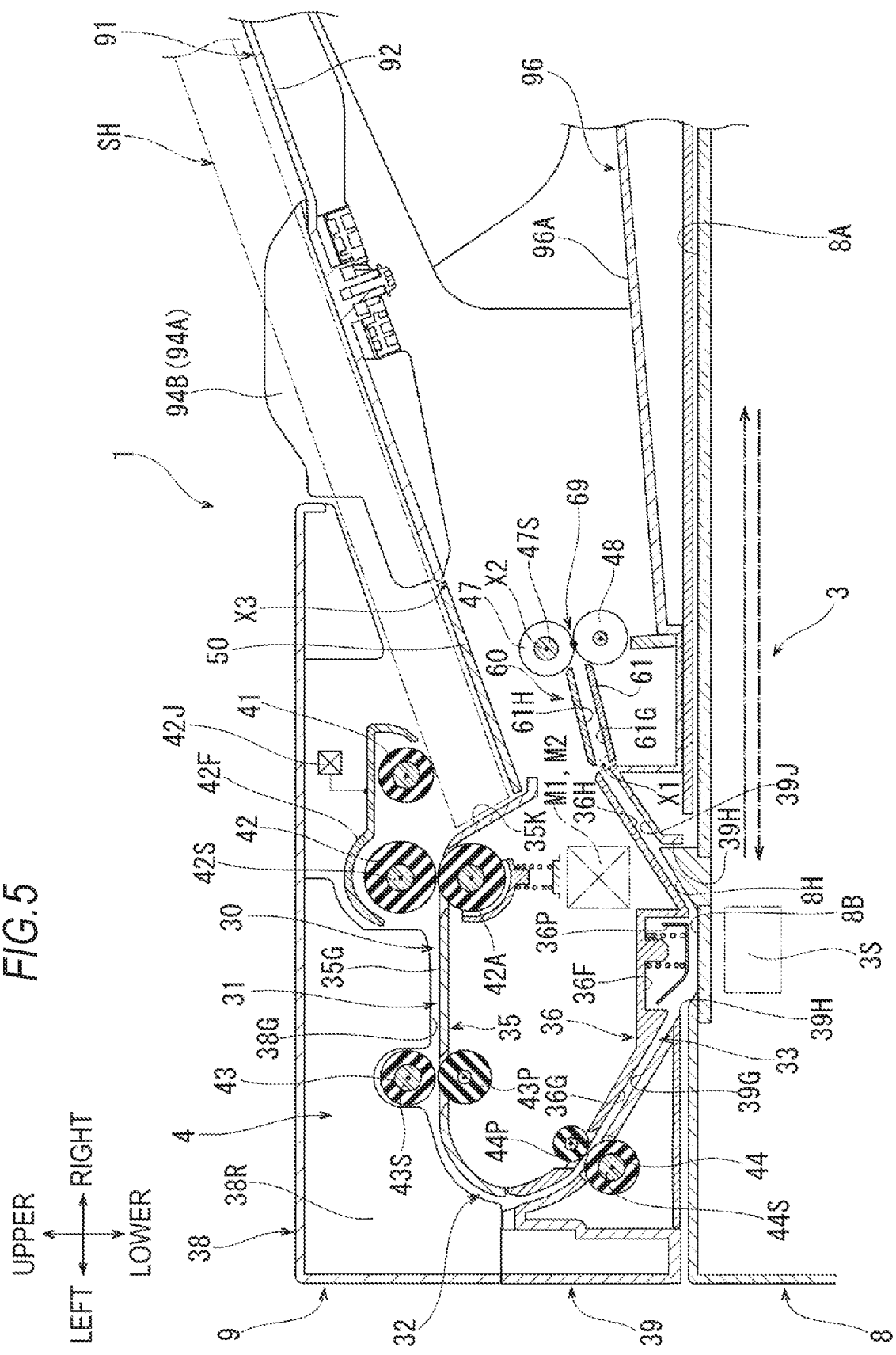
FIG. 5 is a partial cross-sectional view illustrating the image reading apparatus according to the first embodiment.

As illustrated in FIG. 2, the image forming unit 5 is stored at a lower portion in the main body unit 8. The image forming unit 5 forms an image on a sheet by an ink jet method, a laser method, or the like. As illustrated in FIGS. 2 and 5, the reading unit 3 is positioned at an upper portion in the main body unit 8. The reading unit 3 is used when reading an image on a document. The automatic conveyance mechanism 4 is provided in the opening and closing unit 9. The automatic conveyance mechanism 4 is used when allowing the reading unit 3 to read an image on a sheet SH while sequentially conveying the sheet SH supported by a supply tray 91 along a conveyance guide 30.

Figure 4:
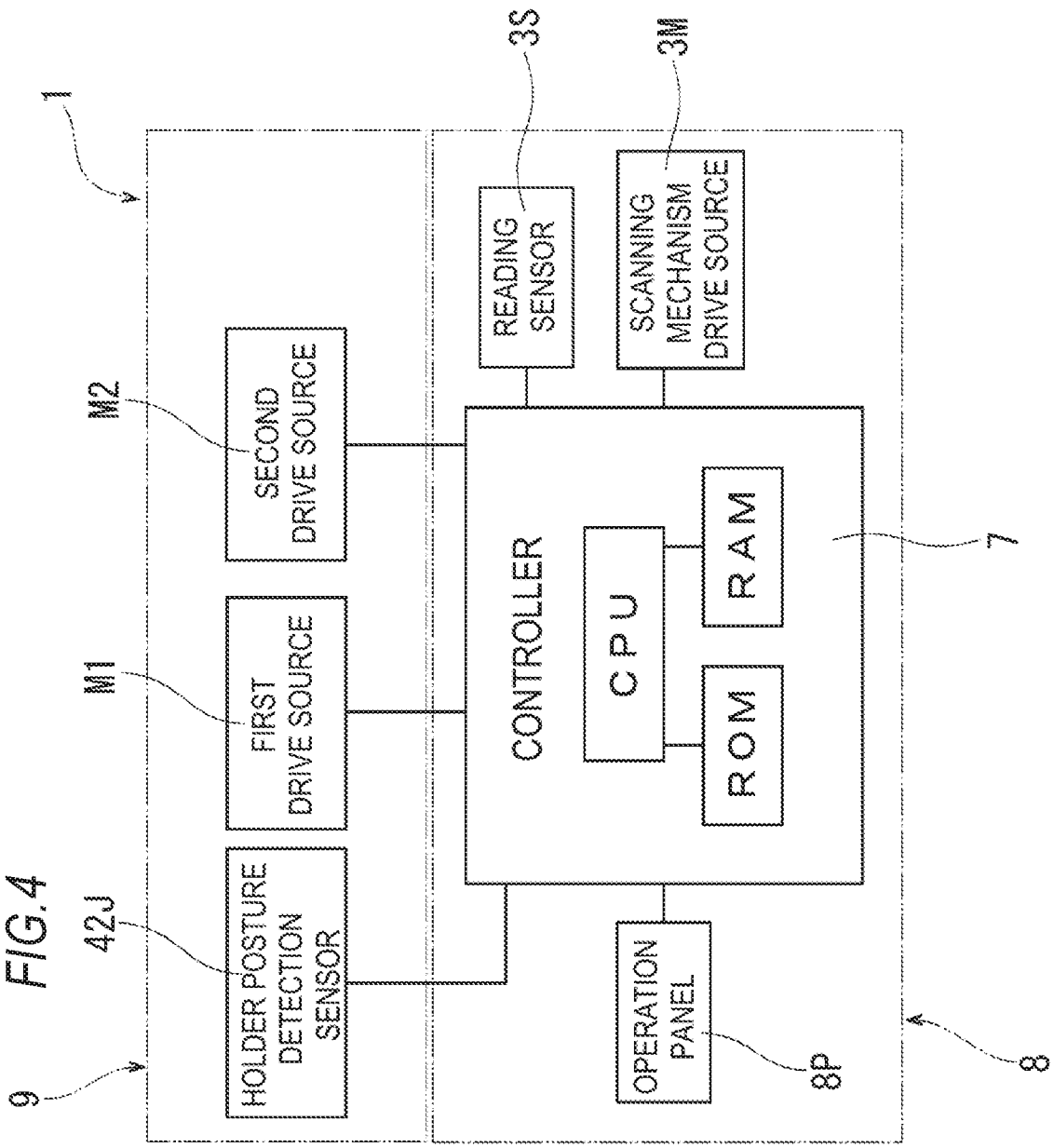
FIG. 4 is a block diagram illustrating the image reading apparatus according to the first embodiment.

As illustrated in FIGS. 2 and 4, the controller 7 is stored at a position along a left side surface in the main body unit 8. The controller 7 is formed as a microcomputer mainly including a CPU, a ROM and a RAM. The ROM stores a program for the CPU to control various operations of the image reading apparatus 1, a program for performing identification processing and the like. The RAM is used as a storage region for temporarily recording data and signals used when the CPU executes the programs, or as a work region for data processing. The controller 7 controls the image forming unit 5, the reading unit 3, the automatic conveyance mechanism 4 and the operation panel 8P.

As illustrated in FIG. 5, platen glass is disposed on an upper surface of the main body unit 8 and a document supporting surface 8A with a large area is formed by an upper surface of the platen glass. Further, another platen glass is disposed on a left side further than the document supporting surface 8A on the upper surface of the main body unit 8, and an elongated reading surface 8B is formed in a front and rear direction by an upper surface of the another platen glass.

The document supporting surface 8A supports the document from below when the reading unit 3 reads an image on the document in a stationary state. The document which is an object to be read includes a sheet such as a paper, or an OHP sheet as well as a book and the like.

The reading surface 8B contacts the conveyed sheet SH from below when the reading unit 3 reads the image on the sheet SH conveyed one by one by the automatic conveyance mechanism 4. A guide protruding unit 8H is provided between the document supporting surface 8A and the reading surface 8B on the upper surface of the main body unit 8. The guide protruding unit 8H scoops up the sheet SH to be conveyed while contacting the reading surface 8B and guides the sheet SH so as to be inclined upward to the right.

Further, in the embodiment, an object whose image is read by using the document supporting surface 8A is described as a document, and an object whose image is read while being conveyed by the automatic conveyance mechanism 4 is described as a sheet. The document and the sheet may be substantially the same.

As illustrated in FIG. 1, the opening and closing unit 9 is supported to be able to oscillate around an opening and closing axis X9 extending in the left and right direction by a hinge, which is not illustrated and disposed at a rear end part of the main body unit 8. The opening and closing unit 9 covers the document supporting surface 8A and the reading surface 8B from above in a closed state illustrated in FIGS. 1 and 5 and the like. Although illustration is omitted, the opening and closing unit 9 is displaced to an open position where the document supporting surface 8A and the reading surface 8B are exposed by oscillating around the opening and closing axis X9 so that the front end part thereof is displaced upward and rearward. Accordingly, a user can support the document which is an object to be read on the document supporting surface 8A.

Further, when describing a configuration, an internal structure and the like of the opening and closing unit 9, a posture of the opening and closing unit 9 in a closed state is set as a reference in the up and down direction and the front and rear direction.

The reading unit 3 includes a reading sensor 3S stored at an upper portion in the main body unit 8 as illustrated in FIGS. 2 to 6, a scanning mechanism drive source 3M illustrated in FIG. 4 and a scanning mechanism, which is not illustrated, driven by the scanning mechanism drive source. As the reading sensor 3S, a well-known image reading sensor such as a contact image sensor (CIS), a charge coupled device (CCD) and the like is used.

As illustrated in FIG. 5, the reading sensor 3S is positioned below the document supporting surface 8A and the reading surface 8B. The scanning mechanism, which is not illustrated, is driven by the scanning mechanism drive source 3M when reading the image on the document supported by the document supporting surface 8A, and the reading sensor 3S is reciprocated in the left and right direction below the document supporting surface 8A in the main body unit 8. Further, the scanning mechanism, which is not illustrated, is driven by the scanning mechanism drive source 3M when the reading sensor 3S reads the image on the sheet SH conveyed by the automatic conveyance mechanism 4, and the reading sensor 3S is stopped under the reading surface 8B in the main body unit 8. A position where the reading sensor 3S is stopped under the reading surface 8B is a predetermined stationary reading position.

Figure 6:
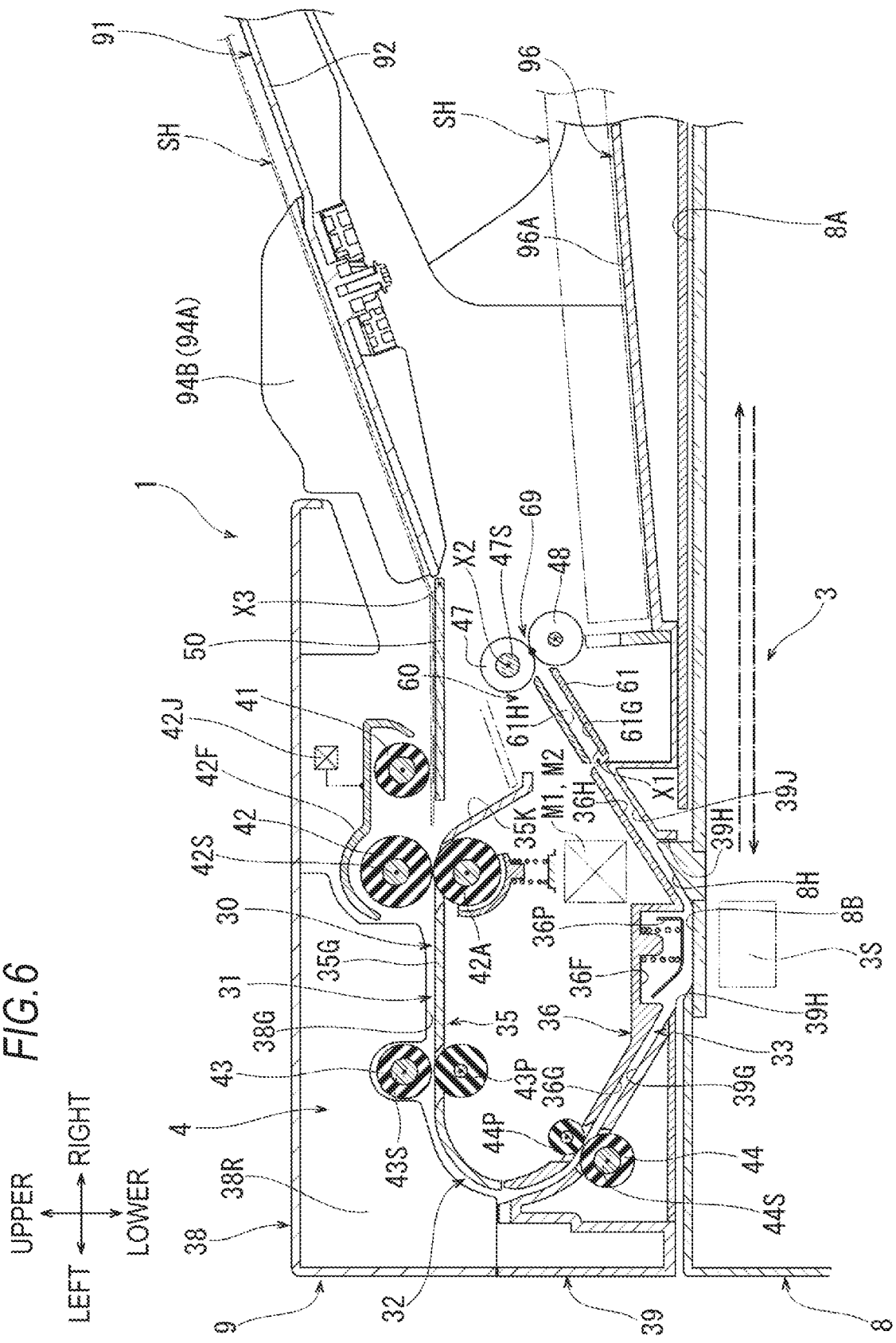
FIG. 6 is a partial cross-sectional view illustrating the image reading apparatus according to the first embodiment.

As illustrated in FIGS. 5 and 6, the opening and closing unit 9 includes a base member 39, a first chute member 35, a second chute member 36 and a cover member 38.

The base member 39 forms a bottom wall of the opening and closing unit 9. In the base member 39, a rectangular hole 39H in which a region opposite to the reading surface 8B and the guide protruding unit 8H is cut out in an approximately rectangular shape is formed. A conveyance surface 39G is formed at a portion positioned on the left side further than the rectangular hole 39H in the base member 39. A left end part of the conveyance surface 39G is curved to be inclined downward to the right by changing a direction from a downward direction. The conveyance surface 39G is inclined downward up to a left end edge of the rectangular hole 39H. Further, a conveyance surface 39J is formed at a portion positioned on the right side further than the rectangular hole 39H in the base member 39. The conveyance surface 39J is adjacent to an upper end edge on the right side of the guide protruding unit 8H of the main body unit 8 and is inclined upward to the right.

The second chute member 36 is disposed above a left portion of the base member 39. A pressing member holding part 36F and guide surfaces 36G and 36H are formed in the second chute member 36. The pressing member holding part 36F is a recessed portion which is recessed upward at a position opposite to the reading surface 8B. In the pressing member holding unit 36F, a pressing member 36P is held to be able to be displaced in the up and down direction. The pressing member 36P presses the sheet SH conveyed while contacting the reading surface 8B from above, thereby preventing the sheet SH from floating from the reading surface 8B. The guide surface 36G is positioned on the left side further than the pressing member holding part 36F. A left end part of the guide surface 36G is curved along the left end part of the conveyance surface 39G of the base member 39. The guide surface 36G is inclined downward to the right along a portion inclined downward of the conveyance surface 39G of the base member 39. The guide surface 36H is positioned on the right side further than the pressing member holding part 36F. The guide surface 36H is inclined upward to the right along the guide protruding unit 8H of the main body unit 8 and the conveyance surface 39J of the base member 39.

The first chute member 35 is disposed above the second chute member 36. A regulation surface 35K and a conveyance surface 35G are formed in the first chute member 35. The regulation surface 35K is inclined upward to the left from a right end part of the first chute member 35. The conveyance surface 35G is connected to an upper end of the regulation surface 35K and extends approximately horizontally to the left. A left end part of the conveyance surface 35G is curved so as to change a direction thereof from the left direction to the downward direction.

The cover member 38 is disposed above the first chute member 35. A guide surface 38G which is formed by lower end edges of a plurality of ribs 38R protruding downward is formed in the cover member 38. A right end part of the guide surface 38G is opposite to the conveyance surface 35G from above at a position deviated to the left side further than a connection unit between the regulation surface 35K and the conveyance surface 35G in the first chute member 35. The guide surface 38G extends approximately horizontally to the left along the conveyance surface 35G of the first chute member 35. A left end part of the guide surface 38G is curved along the left end part of the conveyance surface 35G of the first chute member 35.

Figure 7:
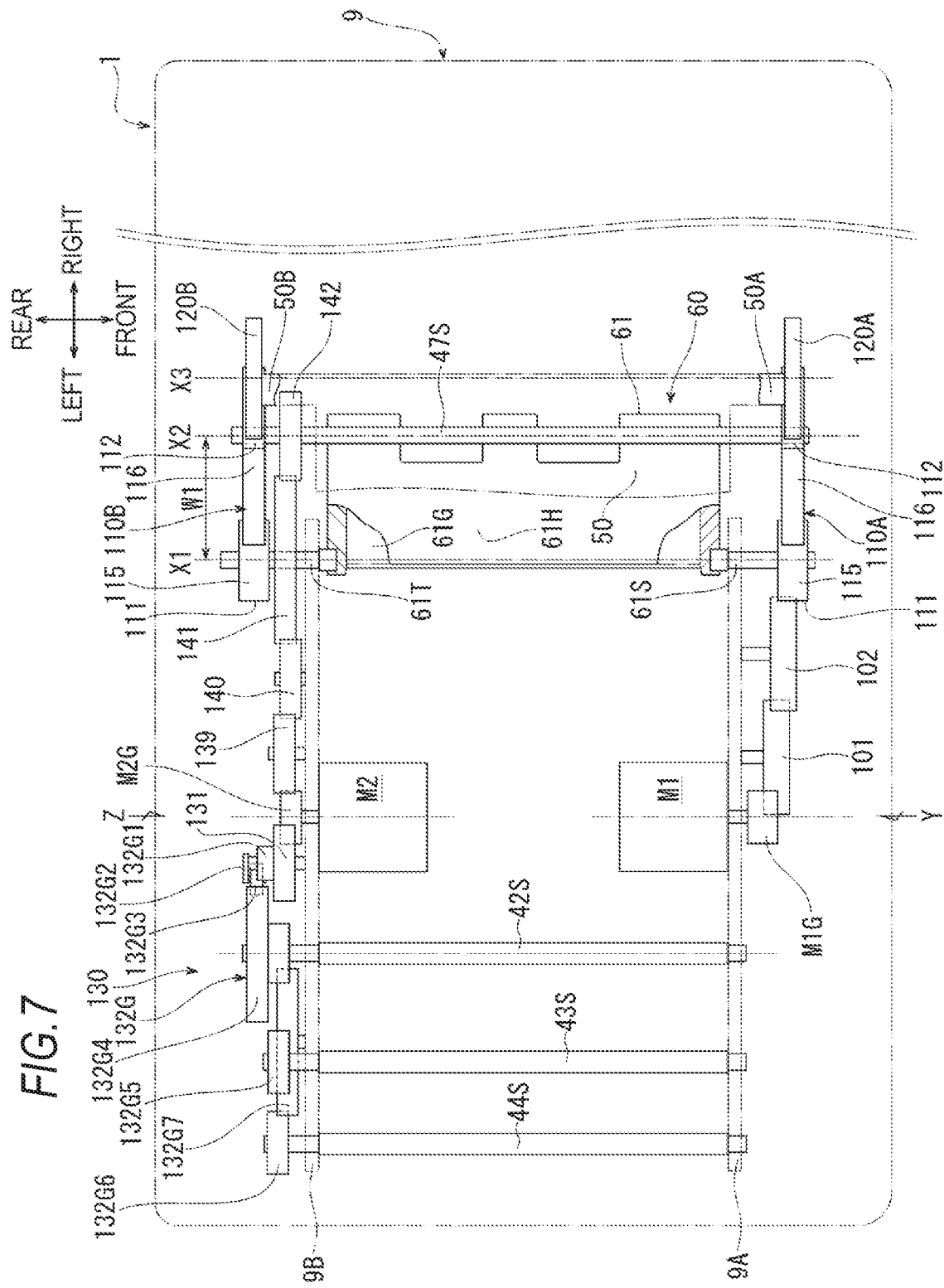
FIG. 7 is a schematic top view illustrating the image reading apparatus according to the first embodiment.
Figure 8:
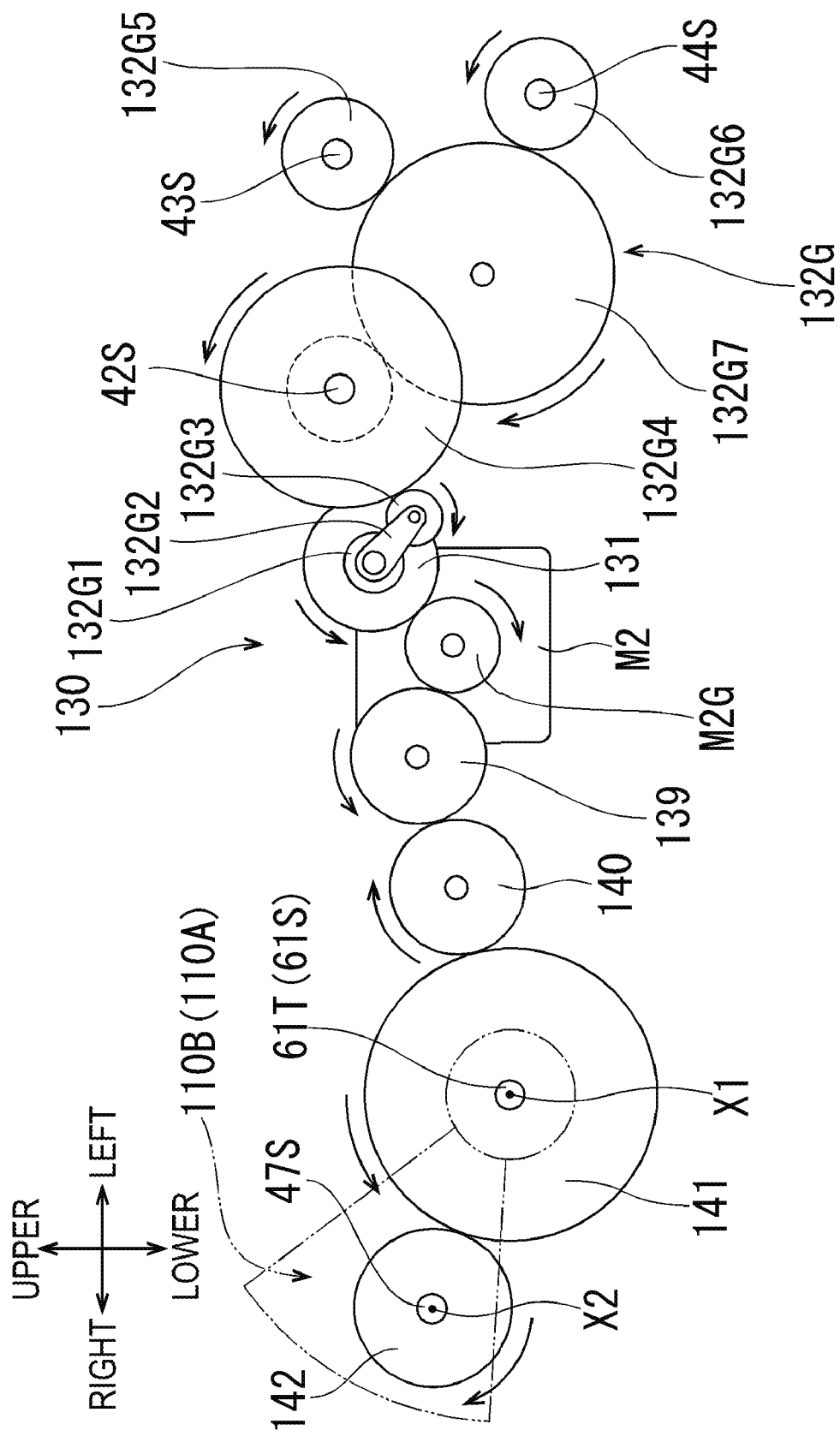
FIG. 8 is a schematic diagram illustrating a second drive source, a conveyance drive train and the like, as viewed from an arrow Z direction in FIG. 7.

As illustrated in FIG. 7, the opening and closing unit 9 is includes a first side frame 9A and a second side frame 9B. The first side frame 9A is disposed to extend in the left and right direction on the front side of the opening and closing unit 9 and forms a part of an internal frame of the opening and closing unit 9. The second side frame 9B is disposed to extend in the left and right direction on the rear surface side of the opening and closing unit 9 and forms a part of the internal frame of the opening and closing unit 9. The first side frame 9A and the second side frame 9B are opposite to each other in the front and rear direction so that the guide surface 38G of the cover member 38, the regulation surface 35K and the conveyance surface 35G of the first chute member 35, the guide surfaces 36G and 36H of the second chute member 36 and the conveyance surfaces 39G and 39J of the base member 39, all of which are illustrated in FIG. 5, are sandwiched therebetween. Further, in FIG. 7, illustration of a supply tray main body 92 of the supply tray 91 is omitted, and the movable plate 50 is simply described, for ease of description. Additionally, FIG. 7 illustrates that positions of a first drive source M1 and a second drive source M2 are deviated to the right side from a position lower than a rotation shaft 42S of a separation roller 42 for ease of description. Also, FIG. 8 illustrates that the position of the second drive source M2 is deviated to the right side from the position lower than the rotation shaft 42S of the separation roller 42.

As illustrated in FIGS. 2, 3, 5, and 6, the opening and closing unit 9 includes the conveyance guide 30 forming a unit of the automatic conveyance mechanism 4, the supply tray 91 for supporting the sheet SH supplied to the conveyance guide 30 and a discharge tray 96 for supporting the sheet SH discharged from the conveyance guide 30.

As illustrated in FIG. 5, the supply tray 91 is positioned on the right side further than the first chute member 35 and is disposed above a right portion of the base member 39. The supply tray 91 includes the supply tray main body 92 and the movable plate 50. The supply tray main body 92 is gently inclined downward from a right end part side of the opening and closing unit 9 to the left. The movable plate 50 is disposed to be adjacent to a left end part of the supply tray main body 92. The movable plate 50 extends in an approximately flat plate shape toward the regulation surface 35K of the first chute member 35. The movable plate 50 is covered with a right portion of the cover member 38 from above. The supply tray 91 supports the sheet SH supplied to the automatic conveyance mechanism 4 by the supply tray main body 92 and the movable plate 50.

The movable plate 50 is rotatably supported around a third axis X3, the right end part of which extends in the front and rear direction. Even though illustration is omitted, the movable plate 50 is rotatably supported by the first side frame 9A and the second side frame 9B illustrated in FIG. 7.

Figure 3:
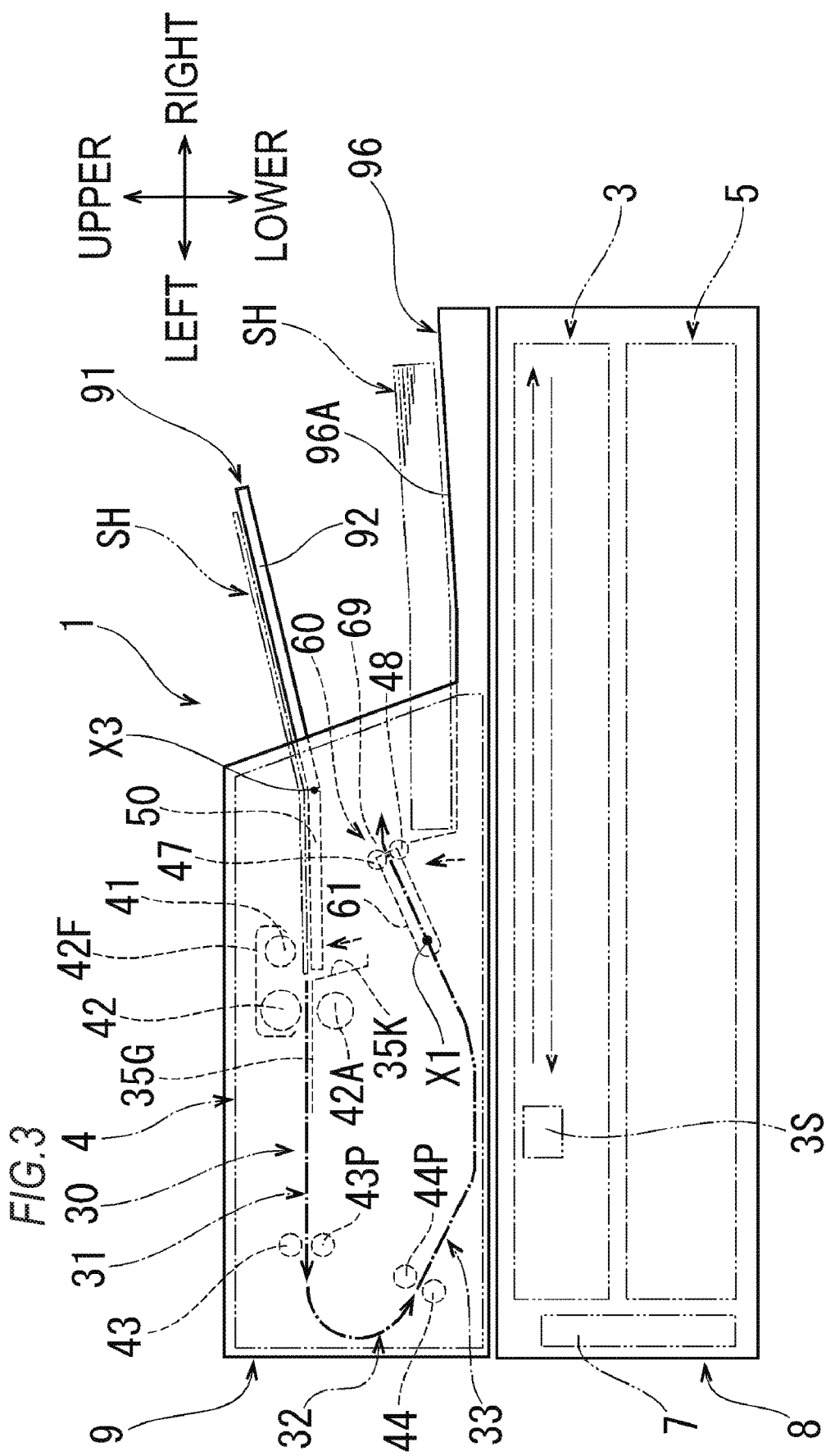
FIG. 3 is a schematic front view illustrating the image reading apparatus according to the first embodiment.
Figure 9:
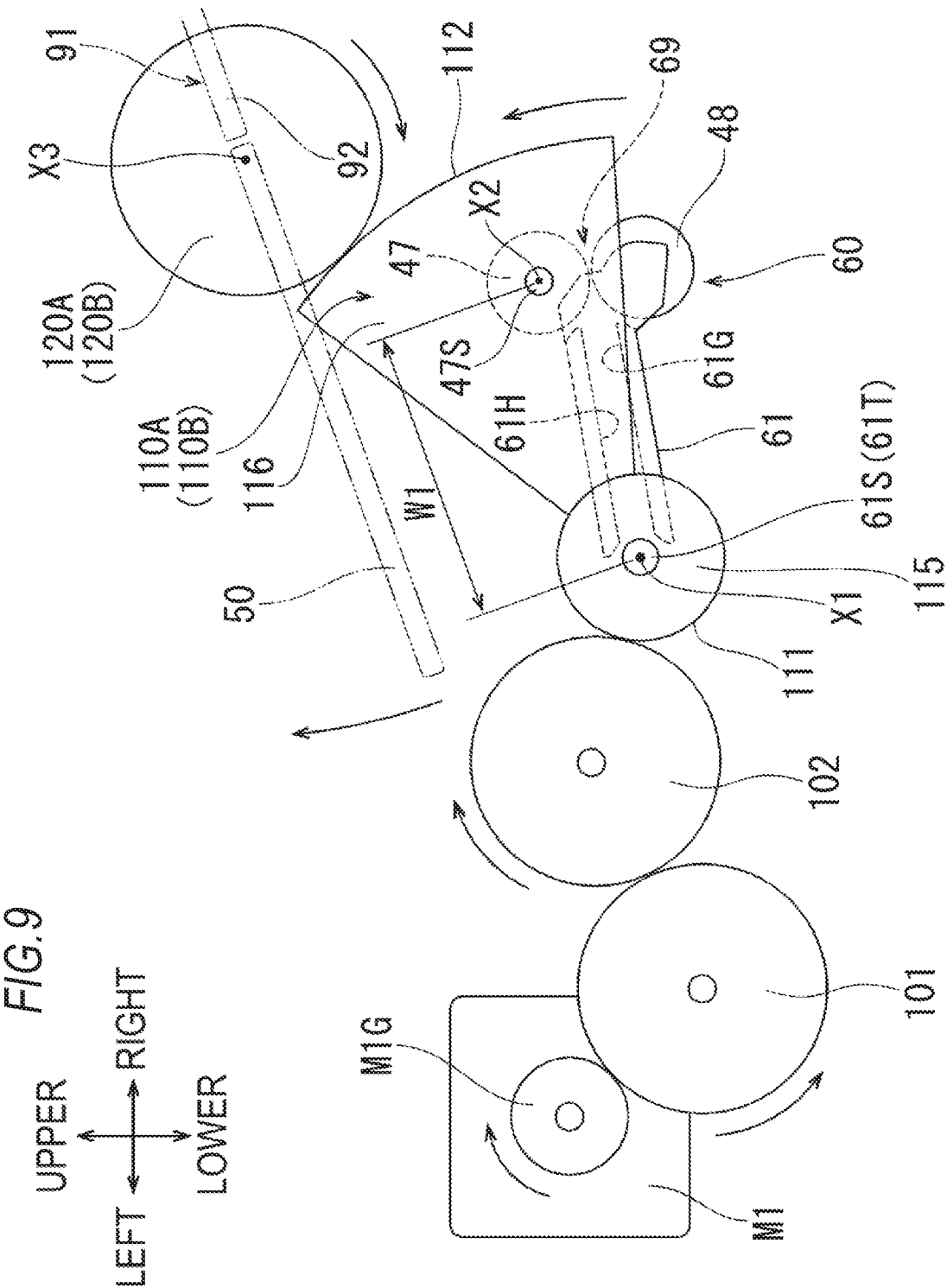
FIG. 9 is a schematic diagram illustrating a movable plate, a discharge unit, a first drive source, a first transmission gear, a second transmission gear and the like, as viewed from an arrow Y direction in FIG. 7, and is a diagram illustrating a state where the movable plate is positioned at a first position and the discharge unit is positioned at a third position.

As will be described later in detail, the movable plate 50 is configured to rotate from a first position illustrated in FIGS. 2, 5 and 9 to a second position illustrated in FIGS. 3, 6 and 10 by operating the first drive source M1, a drive gear M1G, gears 101 and 102, first transmission gears 110A and 110B and second transmission gears 120A and 120B, all of which are illustrated in FIGS. 7 and 9 and the like, according to the decrease of the sheets SH supported by the supply tray 91. The second position illustrated in FIG. 6 and the like is a position above the first position illustrated in FIG. 5 and the like. In other words, the second position is higher than the first position.

As illustrated in FIGS. 1 and 5, two width regulation guides 94A and 94B are provided on the supply tray main body 92 to be respectively slidable in the front and rear direction. A plurality of types of the sheets SH having a different size supported by the supply tray 91 are sandwiched from the front side and the rear side in such a manner that the front width regulation guide 94A and the rear width regulation guide 94B approach each other or are separated from each other. Accordingly, the sheets SH having various sizes can be determined to be positioned based upon a center part in a width direction of the supply tray 91 as a reference.

As illustrated in FIG. 5, the discharge tray 96 is formed on the right portion of the base member 39. That is, the discharge tray 96 is provided so as to be overlapped with the supply tray 91 at a position lower than the supply tray 91. In the discharge tray 96, the sheet SH of which image is read by the reading sensor 3S and which is conveyed by the automatic conveyance mechanism 4 is discharged. An upper surface of the discharge tray 96 is a sheet supporting surface 96A for supporting the sheet SH to be discharged.

The conveyance guide 30 forms a conveyance path for conveying the sheet SH from the supply tray 91 toward the discharge tray 96. Specifically, the conveyance guide 30 includes a first guide 31, a second guide 32 and a third guide 33.

The first guide 31 is configured to include an approximately horizontally extending portion of the conveyance surface 35G of the first chute member 35 and an approximately horizontally extending portion of the guide surface 38G of the cover member 38. The first guide 31 guides the sheet SH sent out from the supply tray 91 to the left.

The second guide 32 is configured to include a curved left end part of the conveyance surface 35G of the first chute member 35; a curved left end part of the guide surface 38G of the cover member 38; a curved left end part of the conveyance surface 39G of the base member 39; and a curved left end part of the guide surface 36G of the second chute member 36. The second guide 32 is connected to the first guide 31 and changes the conveyance direction of the sheet SH from the left direction to the right direction.

The third guide 33 is configured to include a downwardly inclined portion of the conveyance surface 39G of the base member 39; a downwardly inclined portion of the guide surface 36G of the second chute member 36; the conveyance surface 39J of the base member 39; and the guide surface 36H of the second chute member 36. The third guide 33 is connected to the second guide 32 and guides the sheet SH toward the discharge tray 96.

The automatic conveyance mechanism 4 includes a discharge unit 60 to discharge the sheet SH guided by the third guide 33 to the discharge tray 96 by a discharge guide 61. The conveyance surface 61G and the guide surface 61H are formed in the discharge guide 61. The conveyance surface 61G is positioned on the right side further than the conveyance surface 39J of the base member 39 and is inclined upward to the right. The guide surface 61H is positioned on the right side further than the guide surface 36H of the second chute member 36. The guide surface 61H is inclined upward to the right along the conveyance surface 61G. The discharge guide 61 includes a discharge opening 69 to discharge the sheet SH to the discharge tray 96. The discharge opening 69 is opened between a right end part of the conveyance surface 61G and a right end part of the guide surface 61H.

As illustrated in FIG. 7, in the discharge unit 60, the discharge guide 61 is an approximately angular cylindrical member in which a flat plate on which the conveyance surface 61G is formed and a flat plate on which the guide surface 61H is formed are opposite to each other in the up and down direction and a front end edge and a rear end edge of the both flat plates are connected to each other by a pair of front and rear side plates. The discharge guide 61 includes shaft units 61S and 61T in which a first axis X1 extending in the front and rear direction is set as an axis. The first axis X1 is parallel with the third axis X3.

The front shaft unit 61S is a cylindrical shaft protruding forward from a front and left corner part of the conveyance surface 61G and the guide surface 61H. The front shaft unit 61S is rotatably supported by the first side frame 9A and protrudes forward further than the first side frame 9A.

The rear shaft unit 61T is a cylindrical shaft protruding rearward from a rear and left corner part of the conveyance surface 61G and the guide surface 61H. The rear shaft unit 61T is rotatably supported by the second side frame 9B and protrudes rearward further than the second side frame 9B.

Accordingly, the discharge guide 61 is rotatable around the first axis X1. As illustrated in FIG. 5, a position of the first axis X1 is set to be overlapped with a conveyance path formed by the third guide 33 of the conveyance guide 30 and the discharge guide 61. Further, the first axis X1 is positioned at an intermediate part between the reading sensor 3S which is positioned at the stationary reading position and the discharge opening 69 in a discharge direction in which the sheet SH is discharged to the discharge tray 96, that is, in a rightward direction.

The discharge unit 60 includes a discharge roller 47 and a discharge pinch roller 48. The discharge roller 47 is disposed above the discharge opening 69. The discharge pinch roller 48 is disposed below the discharge opening 69. Although not illustrated herein, a plurality of sets of discharge rollers 47 and discharge pinch rollers 48 are disposed to be separated from each other in the front and rear direction.

The discharge roller 47 is fixed to a rotation shaft 47S having a second axis X2 parallel with the first axis X1 as an axis. As illustrated in FIG. 7, a front end part of the rotation shaft 47S protrudes forward further than a front end edge of the discharge guide 61 and the first side frame 9A. A rear end part of the rotation shaft 47S protrudes rearward further than a rear end edge of the discharge guide 61 and the second side frame 9B.

As illustrated in FIGS. 7 and 9, the first transmission gears 110A and 110B are integrally provided in the discharge guide 61. The front first transmission gear 110A is fixed to a tip of the front shaft unit 61S of the discharge guide 61. The rear first transmission gear 110B is fixed to a tip of the rear shaft unit 61T of the discharge guide 61. The first transmission gears 110A and 110B are the same components having a fan shape. The first transmission gears 110A and 110B are rotatable around the first axis X1 together with the discharge unit 60.

The front end part of the rotation shaft 47S is rotatably supported by the front first transmission gear 110A. The rear end part of the rotation shaft 47S is rotatably supported by the rear first transmission gear 110B. That is, the first transmission gears 110A and 110B support the rotation shaft 47S of the discharge roller 47 to be rotatable around the second axis X2 while maintaining the first axis X1 and the second axis X2 at a predetermined interval W1. The front and rear direction is an example of "an axial direction of the discharge roller" of this disclosure.

As illustrated in FIGS. 5 and 9, the discharge pinch roller 48 is rotatably supported at a right end part of the discharge guide 61 and is opposite to the discharge roller 47 from below. The conveyance surface 61G and the guide surface 61H of the discharge guide 61 guide the sheet SH toward a nip position between the discharge roller 47 and the discharge pinch roller 48.

As will be described later in detail, the discharge unit 60 is configured to rotate from a third position illustrated in FIGS. 2, 5 and 9 to a fourth position illustrated in FIGS. 3, 6 and 10 by operating the first drive source M1, the drive gear M1G, the gears 101 and 102 and the front first transmission gear 110A, all of which are illustrated in FIGS. 7 and 9 and the like, according to the decrease of the sheets SH supported by the supply tray 91. The fourth position illustrated in FIG. 6 and the like is a position above the third position illustrated in FIG. 5 and the like. In other words, the fourth position is higher than the third position.

As illustrated in FIG. 5, the automatic conveyance mechanism 4 includes a supply roller 41, the separation roller 42, a retard roller 42A, a first conveyance roller 43, a first pinch roller 43P, a second conveyance roller 44, a second pinch roller 44P, the discharge roller 47 and the discharge pinch roller 48 for conveying the sheet SH along the conveyance guide 30. The discharge roller 47 and the discharge pinch roller 48 are a part of the above-mentioned discharge unit 60.

As illustrated in FIG. 7, the rotation shaft 42S of the separation roller 42, a rotation shaft 43S of the first conveyance roller 43 and a rotation shaft 44S of the second conveyance roller 44 are rotatably supported by the first side frame 9A and the second side frame 9B. Respective rear end parts of the rotation shafts 42S, 43S and 44S protrude rearward further than the second side frame 9B.

As illustrated in FIGS. 7 and 8, the automatic conveyance mechanism 4 includes the second drive source M2 and a conveyance drive train 130 for driving the supply roller 41, the separation roller 42, the first conveyance roller 43, the second conveyance roller 44 and the discharge roller 47. Further, in the embodiment, with respect to each gear forming the second drive source M2 and the conveyance drive train 130, illustration of gear teeth formed on the outer peripheral surface is omitted in FIGS. 7 and 8 and the like.

As illustrated in FIG. 5, the second drive source M2 is disposed between the first guide 31 and the third guide 33. As illustrated in FIG. 7, the second drive source M2 is mounted on a surface facing a front side of the second side frame 9B. A drive shaft of the second drive source M2 protrudes rearward further than the second side frame 9B and a drive gear M2G is fixed to the drive shaft. In the embodiment, the second drive source M2 is a stepping motor. The second drive source M2 is controlled by the controller 7 to generate a drive force, thereby rotating the drive gear M2G clockwise in FIG. 8.

As illustrated in FIGS. 7 and 8, the conveyance drive train 130 is disposed behind the second side frame 9B and is supported by a plurality of shaft units protruding rearward from the second side frame 9B. The conveyance drive train 130 includes a gear 131 which is positioned on a left and upper side with respect to the drive gear M2G and is engaged with the drive gear M2G; and a plurality of gear groups 132G which transmit a drive force from the second drive source M2 via the gear 131. The plurality of gear groups 132G include a sun gear 132G1 integrally rotating with the gear 131 and a planetary gear 132G3 connected to the sun gear 132G1 by an arm 132G2. Further, the plurality of gear groups 132G include gears 132G4, 132G5, 132G6 and 132G7. The gear 132G4 is engaged with the planetary gear 132G3, thereby integrally rotating with the rotation shaft 42S of the separation roller 42. The gear 132G5 transmits the drive force from the gear 132G4 via the gear 132G7, thereby integrally rotating with the rotation shaft 43S of the first conveyance roller 43. The gear 132G6 transmits the drive force from the gear 132G4 via the gear 132G7, thereby integrally rotating with the rotation shaft 44S of the second conveyance roller 44. Further, when the jammed sheet SH is removed in the conveyance guide 30, the gears 132G4, 132G5 and 132G6 become free to rotate by separating the planetary gear 132G3 from the gear 132G4. As a result, the jammed sheet SH can be easily removed.

The plurality of gear groups 132G transmit the drive force from the second drive source M2 to the rotation shaft 42S of the separation roller 42, the rotation shaft 43S of the first conveyance roller 43 and the rotation shaft 44S of the second conveyance roller 44 and rotate the separation roller 42, the first conveyance roller 43 and the second conveyance roller 44, in a direction in which the sheet SH is conveyed toward the reading sensor 3S stopped at a stationary reading position, that is, counter-clockwise illustrated in FIG. 8.

Further, the conveyance drive train 130 includes a gear 139 which is positioned rightward with respect to the drive gear M2G and is engaged with the drive gear M2G, a gear 140 which transmits a drive force from the second drive source M2 to the discharge roller 47 via the gear 139, a first discharge roller drive gear 141 and a second discharge roller drive gear 142. Further, the first transmission gear 110B illustrated by a two-dot chain line in FIG. 8 is positioned on a front side of a paper surface in FIG. 8 with respect to the first discharge roller drive gear 141 and the second discharge roller drive gear 142. The first transmission gear 110A is positioned on a deep side of the paper surface in FIG. 8 with respect to the first discharge roller drive gear 141 and the second discharge roller drive gear 142.

The gear 140 is positioned on the right side with respect to the gear 139 and is engaged with the gear 139. The first discharge roller drive gear 141 is inserted into the rear shaft unit 61T of the discharge guide 61 and is rotatable around the first axis X1 independently from the first transmission gears 110A and 110B. The first discharge roller drive gear 141 is disposed between the second side frame 9B and the rear first transmission gear 110B and is engaged with the gear 140. The second discharge roller drive gear 142 is fixed to the rear end part of the rotation shaft 47S of the discharge roller 47 and is engaged with the first discharge roller drive gear 141. The gears 139 and 140, the first discharge roller drive gear 141 and the second discharge roller drive gear 142 transmit the drive force from the second drive source M2 to the rotation shaft 47S of the discharge roller 47 and then rotates the discharge roller 47 in a direction in which the sheet SH is discharged to the discharge tray 96, that is, clockwise illustrated in FIG. 8.

Since the first transmission gears 110A and 110B support the rotation shaft 47S of the discharge roller 47 to be rotatable around the second axis X2 while maintaining the first axis X1 and the second axis X2 at the predetermined interval W1, the drive force can be suitably transmitted from the first discharge roller drive gear 141 to the second discharge roller drive gear 142.

As illustrated in FIG. 5, the separation roller 42 is disposed at a position deviated to the left side further than the connection part between the regulation surface 35K and the conveyance surface 35G in the first chute member 35.

A holder 42F is rotatably supported in the rotation shaft 42S of the separation roller 42. The holder 42F protrudes toward the right side to be separated from the rotation shaft 42S and to exceed the regulation surface 35K.

The supply roller 41 is rotatably held at a right end part of the holder 42F. The supply roller 41 is provided at a position opposite to the movable plate 50 from above. The rotation shaft 42S and a transmission gear group, which is not illustrated and provided in the holder 42F, transmit the drive force from the second drive source M2 to the supply roller 41, thereby rotating the supply roller 41 in a direction in which the sheet SH supported by the supply tray 91 is sent out to the conveyance guide 30. The supply roller 41 can be displaced in the up and down direction depending on the rotation of the holder 42F.

A holder posture detection sensor 42J is provided in the opening and closing unit 9. The holder posture detection sensor 42J detects whether or not a posture of the holder 42F is an appropriate posture illustrated in FIGS. 5 and 6 and then transmits the detected posture thereof to the controller 7. In a state where the holder 42F is in the appropriate posture illustrated FIGS. 5 and 6, a lower end part of the supply roller 41 has approximately the same height as that of the conveyance surface 35G of the first chute member 35. In this state, the supply roller 41 can appropriately send out the uppermost sheet SH among the sheets SH supported by the supply tray 91 toward the conveyance surface 35G, that is, toward a space between the separation roller 42 and the retard roller 42A.

The retard roller 42A is supported by the first chute member 35 at a position just below the separation roller 42 and is pressed against the separation roller 42. When there exists one sheet SH to be nipped by the separation roller 42 and the retard roller 42A, rotation of the retard roller 42A is allowed by a torque limiter which is not illustrated. On the other hand, when there exist a plurality of sheets SH to be nipped by the separation roller 42 and the retard roller 42A, the rotation of the retard roller 42A is stopped by the torque limiter which is not illustrated. As a result, the retard roller 42A applies a force for stopping the conveyance of the sheet SH with respect to the sheet SH other than the sheet SH in contact with the separation roller 42.

The first conveyance roller 43 is disposed at a connection part between the first guide 31 and the second guide 32 to be opposite to the conveyance surface 35G of the first chute member 35 from above. The first pinch roller 43P is supported by the first chute member 35 and is pressed against the first conveyance roller 43. The first conveyance roller 43 and the first pinch roller 43P nip the sheet SH separated one by one by the separation roller 42 and the retard roller 42A and then convey the nipped sheet SH toward the second guide 32.

The second conveyance roller 44 is disposed at a connection part between the second guide 32 and the third guide 33 to be opposite to the guide surface 36G of the second chute member 36 from below. The second pinch roller 44P is supported by the second chute member 36 and is pressed against the second conveyance roller 44. The second conveyance roller 44 and the second pinch roller 44P nip the sheet SH to be conveyed by the first conveyance roller 43 and the first pinch roller 43p and then convey the nipped sheet SH toward the reading surface 8B, that is, toward the reading sensor 3S which is stopped at the stationary reading position.

The discharge roller 47 and the discharge pinch roller 48 nip the sheet SH which passes over the reading surface 8B and is guided by the discharge guide 61, after which the nipped sheet SH is discharged from the discharge opening 69 toward the discharge tray 96.

<Configurations of First Drive Source, First Transmission Gear, Second Transmission Gear and the Like>

As illustrated in FIGS. 7 and 9 and the like, the automatic conveyance mechanism 4 includes the first drive source M1 for performing the rotation operation of the movable plate 50 and the discharge unit 60, the drive gear M1G, the gears 101 and 102, the first transmission gears 110A and 110B and the second transmission gears 120A and 120B. Further, in the embodiment, with respect to the drive gear M1G, the gears 101 and 102, the first transmission gears 110A and 110B and the second transmission gears 120A and 120B, illustration of gear teeth formed on the outer peripheral surface thereof is omitted in FIGS. 7 and 9 and the like.

As illustrated in FIG. 5, the first drive source M1 is disposed between the first guide 31 and the third guide 33. As illustrated in FIG. 7, the first drive source M1 is mounted on a surface facing the rear side of the first side frame 9A. A drive shaft of the first drive source M1 protrudes forward further than the first side frame 9A and the drive gear M1G is fixed to the drive shaft thereof. In the embodiment, the first drive source M1 is a stepping motor. The first drive source M1 is controlled by the controller 7 to generate the drive force, thereby rotating the drive gear M1G clockwise and counter-clockwise in FIGS. 9 and 10.

Figure 10:
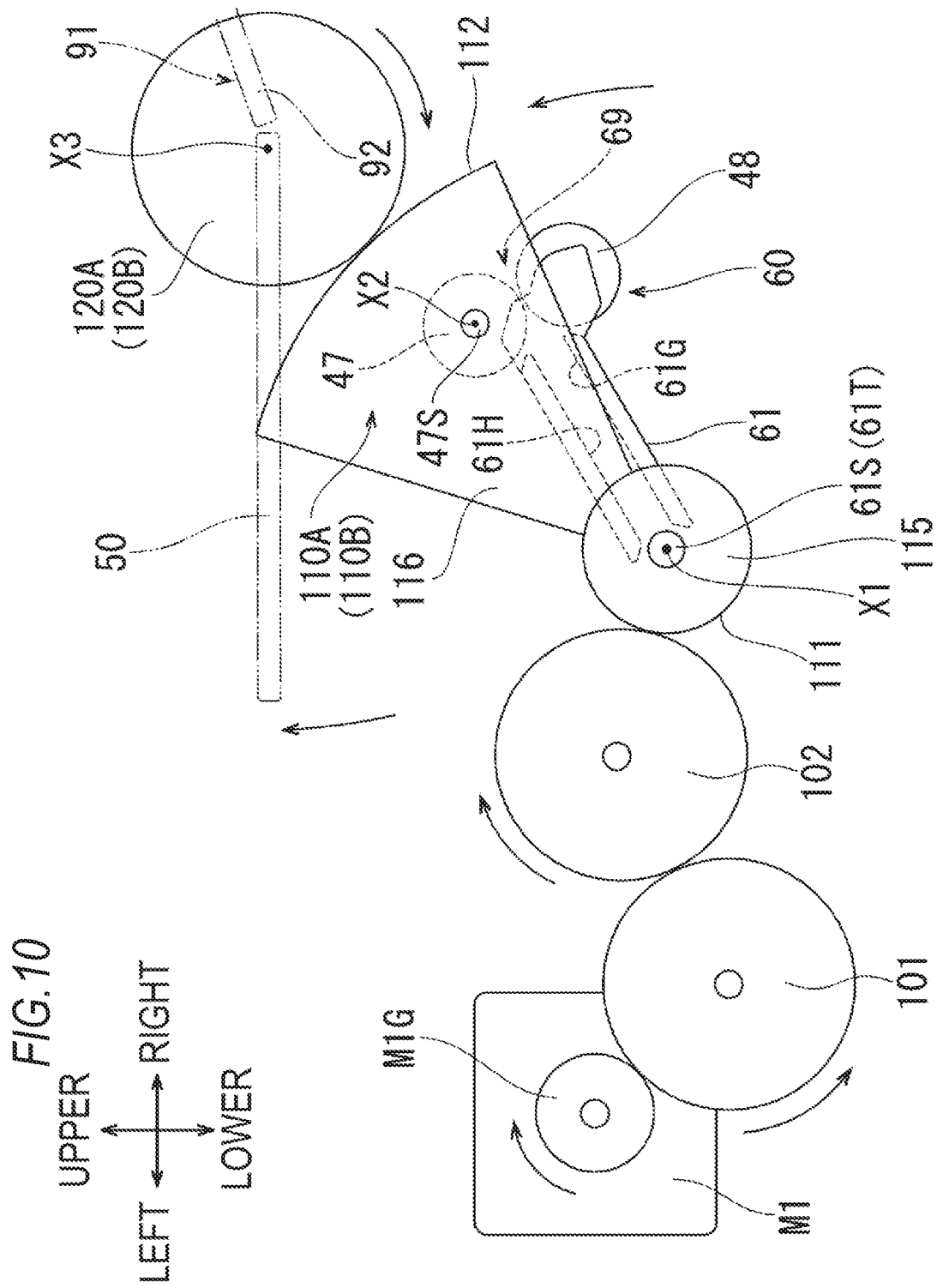
FIG. 10 is a schematic diagram same as that of FIG. 9 and is a diagram illustrating a state where the movable plate is moved to a second position and the discharge unit is moved to a fourth position.

A plurality of arrows illustrated in FIGS. 9 and 10 indicate a rotation direction when the drive gear M1G rotates clockwise in FIGS. 9 and 10. Further, when the drive gear M1G rotates counter-clockwise in FIGS. 9 and 10, the rotation direction becomes a rotation direction opposite to each arrow illustrated in FIGS. 9 and 10.

As illustrated in FIGS. 7 and 9, the gears 101 and 102 are disposed forward further than the first side frame 9A and are supported by a plurality of shaft units protruding forward from the first side frame 9A. The gear 101 is positioned rightward and downward with respect to the drive gear M1G and is engaged with the drive gear M1G. The gear 102 is positioned on the right side with respect to the gear 101 and is engaged with the gear 101.

The first transmission gears 110A and 110B include a fan shaped arc gear 116 and a small diameter gear 115. As illustrated in FIG. 9, the fan shaped arc gear 116 is formed in a fan shape including a top part of an acute angle disposed on a side of the first axis X1 and a circular arc centering on the first axis X1. The small diameter gear 115 is formed in a circular shape centering on the first axis X1 and is provided integrally with the top part of the fan shaped arc gear 116. The small diameter gear 115 includes a diameter smaller than the diameter of the fan shaped arc gear 116. The fan shaped arc gear 116 includes fan shaped gear teeth 112. The small diameter gear 115 includes small diameter gear teeth 111.

As illustrated in FIGS. 7 and 9, the small diameter gear teeth 111 of the front first transmission gear 110A is positioned on the right side with respect to the gear 102 and is engaged with the gear 102. Further, in the embodiment, the small diameter gear teeth 111 of the rear first transmission gear 110B are not used.

As illustrated in FIG. 7, protruding units 50A and 50B are formed in the movable plate 50. The front protruding unit 50A protrudes forward from the right and front corner part of the movable plate 50. The rear protruding unit 50B protrudes rearward from the right and rear corner part of the movable plate 50.

The front second transmission gear 120A is fixed to the front protruding unit 50A of the movable plate 50. The rear second transmission gear 120B is fixed to the rear protruding unit 50B of the movable plate 50. Accordingly, the second transmission gears 120A and 120B are rotatable around the third axis X3 integrally with the movable plate 50.

As illustrated in FIGS. 7 and 9, the front second transmission gear 120A is positioned rightward and upward with respect to the fan shaped gear teeth 112 of the front first transmission gear 110A and is engaged with the fan shaped gear teeth 112. The rear second transmission gear 120B is positioned rightward and upward with respect to the fan shaped gear teeth 112 of the rear first transmission gear 110B and is engaged with the fan shaped gear teeth 112.

Next, operations of the drive gear M1G, the gears 101 and 102, the first transmission gears 110A and 110B and the second transmission gears 120A and 120B will be described. When the first drive source M1 rotates the drive gear M1G clockwise in FIG. 9, the drive force from the first drive source M1 is transmitted to the small diameter gear teeth 111 of the front first transmission gear 110A via the gears 101 and 102. Accordingly, since the first transmission gears 110A and 110B and the discharge guide 61 integrally rotate upward, the discharge unit 60 rotates around the first axis X1 to displace the discharge opening 69 upward and then moves from the third position illustrated in FIG. 5 and the like to the fourth position illustrated in FIG. 6 and the like.

At the same time, the fan shaped gear teeth 112 of the first transmission gears 101A and 110B rotate upward around the first axis X1; the drive force from the first drive source M1 is transmitted to the second transmission gears 120A and 120B by the first transmission gears 110A and 110B; and the second transmission gears 120A and 120B rotate clockwise in FIG. 9. As a result, as illustrated in FIG. 10, the movable plate 50 rotates around the third axis X3 to displace the left end part thereof upward and then moves from the first position illustrated in FIG. 5 and the like to the second position illustrated in FIG. 6 and the like.

Further, when the first drive source M1 rotates the drive gear M1G counter-clockwise in FIG. 10, the gears 101 and 102, the first transmission gears 110A and 110B and the second transmission gears 120A and 120B are operated in a manner opposite to the above-mentioned operation. As a result, as illustrated in FIG. 9, the discharge unit 60 rotates around the first axis X1 to displace the discharge opening 69 downward and then moves to the third position illustrated in FIG. 5 and the like. Further, the movable plate 50 rotates around the third axis X3 to displace the left end part thereof downward and then moves to the first position illustrated in FIG. 5 and the like.

That is, the discharge unit 60 is configured to be moved by receiving the drive force from the first drive source M1 which is transmitted by the drive gear M1G, the gears 101 and 102 and the small diameter gear teeth 111 of the front first transmission gear 110A and is configured to transmit the drive force from the first drive source M1 to the movable plate 50 by the fan shaped gear teeth 112 of the first transmission gears 110A and 110B and the second transmission gears 120A and 120B.

As illustrated in FIG. 5, when the movable plate 50 is in the first position, the left end part of the movable plate 50 is at a position opposite to a lower end part of the regulation surface 35K of the first chute member 35 and an downward inclination angle of an upper surface of the movable plate 50 is approximately the same as an downward inclination angle of an upper surface of the supply tray main body 92. In this state, the supply tray 91 can support the sheets SH with the maximum number of stacked sheets. When the movable plate 50 is at the first position and the supply roller 41 abuts on the uppermost sheet SH of the maximum number of stacked sheets SH, the posture of the holder 42F becomes the appropriate posture illustrated in FIG. 5.

As illustrated in FIG. 6, when the movable plate 50 is at the second position, the left end part of the movable plate 50 is at a position opposite to the upper end part of the regulation surface 35K of the first chute member 35 and the upper surface of the movable plate 50 is in a state of extending approximately horizontally at the same height as that of the conveyance surface 35G of the first chute member 35. In this state, the supply tray 91 supports about one to several numbers of the sheets SH. When the movable plate 50 is at the second position and the supply roller 41 abuts on the uppermost sheet SH of the one to several numbers of the sheets SH, the posture of the holder 42F becomes the appropriate posture illustrated in FIG. 6.

When it is determined that the posture of the holder 42F is in a state of descending beyond an allowable range from the appropriate posture illustrated in FIGS. 5 and 6 based on a detection signal of the holder posture detection sensor 42J, the controller 7 operates the first drive source M1 such that the discharge unit 60 rotates little by little from the third position illustrated in FIG. 5 and the like to the fourth position illustrated in FIG. 6 and the like and also causes the discharge unit 6 to drive the movable plate 50 to rotate the movable plate 50 little by little from the first position illustrated in FIG. 5 and the like to the second position illustrated in FIG. 6 and the like, whereby the holder 42F is controlled to maintain the appropriate posture illustrated in FIGS. 5 and 6. At this time, it is possible not only to determine positions of components of the discharge opening 69 and the discharge unit 60 with high accuracy, but also to determine the position of the movable plate 50 in a desired rotation posture with high accuracy by finely changing rotation postures of the first transmission gears 110A and 110B by rotation angle control of the first drive source M1 which is the stepping motor. Accordingly, the image reading apparatus 1 achieves the miniaturization in the up and down direction by a configuration in which the movable plate 50 of the supply tray 91 rotates by being driven by the rotation of the discharge unit 60.

As illustrated in FIG. 5, when the discharge unit 60 is at the third position, the discharge opening 69, the discharge roller 47 and the discharge pinch roller 48 are at positions close to the sheet supporting surface 96A of the discharge tray 96. A state of the discharge unit 60 corresponds to a case in which the number of sheets SH supported by the sheet supporting surface 96A of the discharge tray 96 is small.

As illustrated in FIG. 6, when the discharge unit 60 is at the fourth position, the discharge opening 69, the discharge roller 47 and the discharge pinch roller 48 are at positions separated upward from the sheet supporting surface 96A of the discharge tray 96. A state of the discharge unit 60 corresponds to a case in which the sheets SH are supported by the sheet supporting surface 96A of the discharge tray 96 with the maximum number of stacked sheets. In other words, in this state, the discharge opening 69 of the discharge unit 60 is sufficiently separated upward from the uppermost sheet SH among the sheets SH supported by the sheet supporting surface 96A with the maximum number of stacked sheets.

<Image Reading Operation>

In the image reading apparatus 1, when reading an image on a document supported by the document supporting surface 8A, the controller 7 operates the scanning mechanism, which is not illustrated, by controlling the scanning mechanism drive source 3M of the reading unit 3 and moves the reading sensor 3S in the left and right direction from a reading start position below a left end edge of the document supporting surface 8A to a reading end position below a right end edge thereof. Accordingly, the reading sensor 3S reads the image on the document supported by the document supporting surface 8A. Thereafter, the controller 7 operates the scanning mechanism, which is not illustrated, in a reverse direction by controlling the scanning mechanism drive source 3M of the reading unit 3 and then moves the reading sensor 3S which completes the reading from a right end to a left end in the reading unit 3, thereby returning to a standby position.

Further, in the image reading apparatus 1, the sheet SH supported by the supply tray 91 is conveyed by the automatic conveyance mechanism 4; when reading the image on the sheet SH, the controller 7 operates the scanning mechanism, which is not illustrated, by controlling the scanning mechanism drive source 3M of the reading unit 3; and the reading sensor 3S is stopped at the stationary reading position below the reading surface 8B. Here, it is assumed that the movable plate 50 is at the first position illustrated in FIG. 5 and the like, the discharge unit 60 is at the third position illustrated in FIG. 5 and the like and the sheet SH is in a state of not being supported by the discharge tray 96.

Next, the controller 7 determines whether or not the holder posture detection sensor 42J is in the appropriate posture illustrated in FIGS. 5 and 6 based on the detection signal of the holder posture detection sensor 42J. When the holder posture detection sensor 42J is not in the appropriate posture illustrated in FIGS. 5 and 6, the controller 7 operates the first drive source M1, thereby rotating the discharge unit 60 little by little toward the fourth position illustrated in FIG. 6 and the like and causing the discharge unit 60 to drive the movable plate 50 to rotate the movable plate 50 little by little toward the second position illustrated in FIG. 6 and the like and therefore the holder 42F is controlled to maintain the appropriate posture illustrated in FIGS. 5 and 6.

Next, the controller 7 operates the second drive source M2 and the conveyance drive train 130. Accordingly, the controller 7 drives the supply roller 41, the separation roller 42, the first conveyance roller 43, the second conveyance roller 44 and the discharge roller 47 and supplies the sheet SH supported by the supply tray 91 to the conveyance guide 30 to sequentially convey the supplied sheet SH along the conveyance guide 30. When the conveyed sheet SH passes over the reading surface 8B, the controller 7 reads the image on the conveyed sheet SH by the reading sensor 3S which is stopped at the stationary reading position. Next, the controller 7 discharges the sheet SH whose image is read out from the discharge opening 69 toward the discharge tray 96 by the discharge guide 61, the discharge roller 47 and the discharge pinch roller 48 of the discharge unit 60.

Meanwhile, the controller 7 rotates the discharge unit 60 little by little toward the fourth position illustrated in FIG. 6 and the like according to the decrease of the sheets SH supported by the supply tray 91 based on the detection signal of the holder posture detection sensor 42J and causes the discharge unit 60 to drive the movable plate 50 to rotate the movable plate 50 little by little toward the second position illustrated in FIG. 6 and the like. As illustrated in FIG. 6, when the number of sheets SH supported by the supply tray 91 decreases and the sheet SH runs out, the controller 7 stops the second drive source M2 and terminates the image reading operation.

Thereafter, the controller 7 operates the scanning mechanism, which is not illustrated, by controlling the scanning mechanism drive source 3M of the reading unit 3 and then returns the reading sensor 3S to the standby position. Further, the controller 7 operates the first drive source M1, the first drive train 110 and the second drive train 120 after confirming that the sheet SH is not supported by the discharge tray 96 by a detection means which is not illustrated, returns the movable plate 50 to the first position illustrated in FIG. 5 and the like and returns the discharge unit 60 to the third position illustrated in FIG. 5 and the like.

<Operational Effect>

In the image reading apparatus 1 of the first embodiment, as illustrated in FIGS. 5 and 6 and the like, it is possible to achieve the miniaturization in the up and down direction by a configuration in which the movable plate 50 and the discharge unit 60 move according to the decrease of the sheets SH supported by the supply tray 91.

Further, in the image reading apparatus 1, as illustrated in FIGS. 7, 9 and 10, the drive force from the first drive source M1 is transmitted to the discharge unit 60 by the drive gear M1G, the gears 101 and 102 and the small diameter gear teeth 111 of the front first transmission gear 110A, thereby moving the discharge unit 60. Next, the drive force from the first drive source M1 is transmitted to the movable plate 50 via the discharge unit 60 by the fan shaped gear teeth 112 of the first transmission gears 110A and 110B and the second transmission gears 120A and 120B, thereby moving the movable plate 50. That is, the movable plate 50 is driven by the discharge unit 60, so that the discharge unit 60 on an upstream side to which the drive force from the first drive source M1 is transmitted is less likely to cause troubles such as positional displacement and the like than the movable plate 50 on a downstream side. More specifically, in the drive system train, when a member on the downstream side is moved according to the movement of a member on the upstream side, a deviation of positional accuracy of the member on the upstream side (a drive side) is easy to be superimposed on a deviation of positional accuracy of the member on the downstream side (a driven side). Therefore, when it is assumed that the movable plate 50 is the member on the upstream side (the drive side) in the drive system train and the discharge unit 60 is the member on the downstream side (the driven side) in the drive system train, the deviation of the positional accuracy of the movable plate 50 is superimposed on the deviation of the positional accuracy of the discharge unit 60, thereby causing a problem that that the discharge unit 60 is more likely to generate the troubles such as the positional displacement and the like than the movable plate 50. In consideration of the above-mentioned points, in the embodiment, since the discharge unit 60 is used as the member on the upstream side (the drive side) in the drive system train and the movable plate 50 is used as the member on the downstream side (the driven side) in the drive system train, the deviation of the positional accuracy of the movable plate 50 is not superimposed on the deviation of the positional accuracy of the discharge unit 60. Therefore, in the image reading apparatus 1, it is possible not only to determine positions of the components of the discharge opening 69 and the discharge unit 60 with high accuracy, but also to prevent a variation of a path length of the conveyance guide 30 according to the movement of the movable plate 50 and the discharge unit 60. As a result, a conveyance speed of the sheet SH conveyed on the conveyance guide 30 is not likely to become unstable.

Therefore, in the image reading apparatus 1 of the first embodiment, it is possible not only to achieve the miniaturization in the up and down direction, but also to suppress the deterioration in the reading accuracy of the reading sensor 3S.

Further, in the image reading apparatus 1, as illustrated in FIGS. 7 and 9 and the like, the first transmission gears 110A and 110B are rotatable around the first axis X1 together with the discharge unit 60 and transmit the drive force from the first drive source M1 to the movable plate 50. The first discharge roller drive gear 141 that is rotatable around the first axis X1 independently from the first transmission gears 110A and 110B and the second discharge roller drive gear 142 that is engaged with the first discharge roller drive gear 141 and is rotatable around the second axis X2 parallel with the first axis X1 together with the rotation shaft 47S of the discharge roller 47 are driven by the second drive source M2 provided separately from the first drive source M1. According to the above-mentioned specific configuration, in the image reading apparatus 1, it is possible to appropriately perform a movement operation of the movable plate 50 and the discharge unit 60 and a discharge operation of the sheet SH by the discharge roller 47, respectively. Further, since the first transmission gears 110A and 110B also have a function of transmitting the drive force from the first drive source M1 to the movable plate 50 and a function of supporting the rotation shaft 47S of the discharge roller 47, the number of components can be reduced.

Further, in the image reading apparatus 1, as illustrated in FIG. 9 and the like, since the transmission gears 110A and 110B are fan shaped, the first transmission gears 110A and 110B can be designed to be smaller in comparison with a case where the first transmission gears 110A and 110B are circular shaped, thereby enabling to further achieve the miniaturization.

Further, in the image reading apparatus 1, simplification can be achieved by a configuration in which the movable plate 50 rotates around the third axis X3 in comparison with a case where the movable plate 50 is linearly moved. Further, when the movable plate 50 is configured to be linearly moved, a level difference can be formed between the movable plate 50 and a portion other than the movable plate 50 in the supply tray 91. Therefore, the sheet SH supported by the supply tray 91 has to be bent in an approximately crank shape along the level difference. However, when the sheet SH is stiff due to curling or the like, the sheet SH is hard to follow the level difference and there is a concern that the sheet SH may float up with respect to the movable plate 50. In this case, in the embodiment, since the movable plate 50 is only bent with respect to the supply tray main body 92, the sheet SH supported by the supply tray 91 is easy to be bent along the bent portion and therefore, the sheet SH can be prevented from floating up with respect to the movable plate 50.

Further, in the image reading apparatus 1, as illustrated in FIG. 9 and the like, according to the configuration in which the second transmission gears 120A and 120B that are rotatable around the third axis X3 together with the movable plate 50 are engaged with the first transmission gears 110A and 110B, it is possible to surely transmit the drive force from the first drive source M1 to the movable plate 50 while preventing generation of dust and generation of abnormal noise. Further, in the image reading apparatus 1, it is possible to prevent a self-lock which may occur when the movable plate 50 and the discharge unit 60 are connected to each other by a link.

Further, in the image reading apparatus 1, as illustrated in FIG. 5 and the like, the first axis X1 around which the discharge guide 61 rotates is positioned at the intermediate part between the reading sensor 3S which is positioned at the stationary reading position and the discharge opening 69 in the discharge direction in which the sheet SH is discharged to the discharge tray 96, that is, in the rightward direction. According to the aforementioned configuration, since the first axis X1 can be disposed at a position separated upwardly to some extent with respect to the reading surface 8B, it is easy to secure arrangement spaces for the first transmission gears 110A and 110B and the like.

Further, in the image reading apparatus 1, as illustrated in FIG. 5 and the like, the first drive source M1 and the second drive source M2 are disposed between the first guide 31 and the third guide 33. Accordingly, a space that is surrounded by the conveyance guide 30 extending in an approximately U-shape from the supply tray 91 toward the discharge tray 96 can be effectively utilized as arrangement spaces of the first drive source M1 and the second drive source M2. As a result, the miniaturization of the image reading apparatus 1 can be achieved.

Further, in the image reading apparatus 1, the drive force from the first drive source M1 is transmitted to the movable plate 50 by the first transmission gear 110A that is fixed to the front shaft unit 61S of the discharge guide 61 and the first transmission gear 110B that is fixed to the rear shaft unit 61T of the discharge guide 61. Accordingly, it is possible to prevent the movable plate 50 from being inclined with respect to the first axis X1 and the second axis X2 extending in the front and rear direction and to appropriately move the movable plate 50.

Further, in the image reading apparatus 1, as illustrated in FIG. 7, the first drive source M1 is supported by the first side frame 9A. The second drive source M2 is supported by the second side frame 9B. The first drive source M1 and the second drive source M2 are disposed to be separated from each other at a front portion and a rear portion of the space that is surrounded by the conveyance guide 30 extending in the approximately U-shape from the supply tray 91 toward the discharge tray 96. As a result, the image reading apparatus 1 can achieve further miniaturization. Further, in the image reading apparatus 1, the first drive source M1, the first transmission gears 110A and 110B, the second transmission gears 120A and 120B and the like, all of which perform the movement operation of the movable plate 50 and the discharge unit 60 and the second drive source M2, the first discharge roller drive gear 141, the second discharge roller drive gear 142 and the like, all of which perform the discharge operation of the sheet by the discharge roller 47 are disposed in a state of being dispersed forward and rearward with respect to the conveyance guide 30. As a result, both arrangement spaces can be reduced.

Second Embodiment

Figure 11:
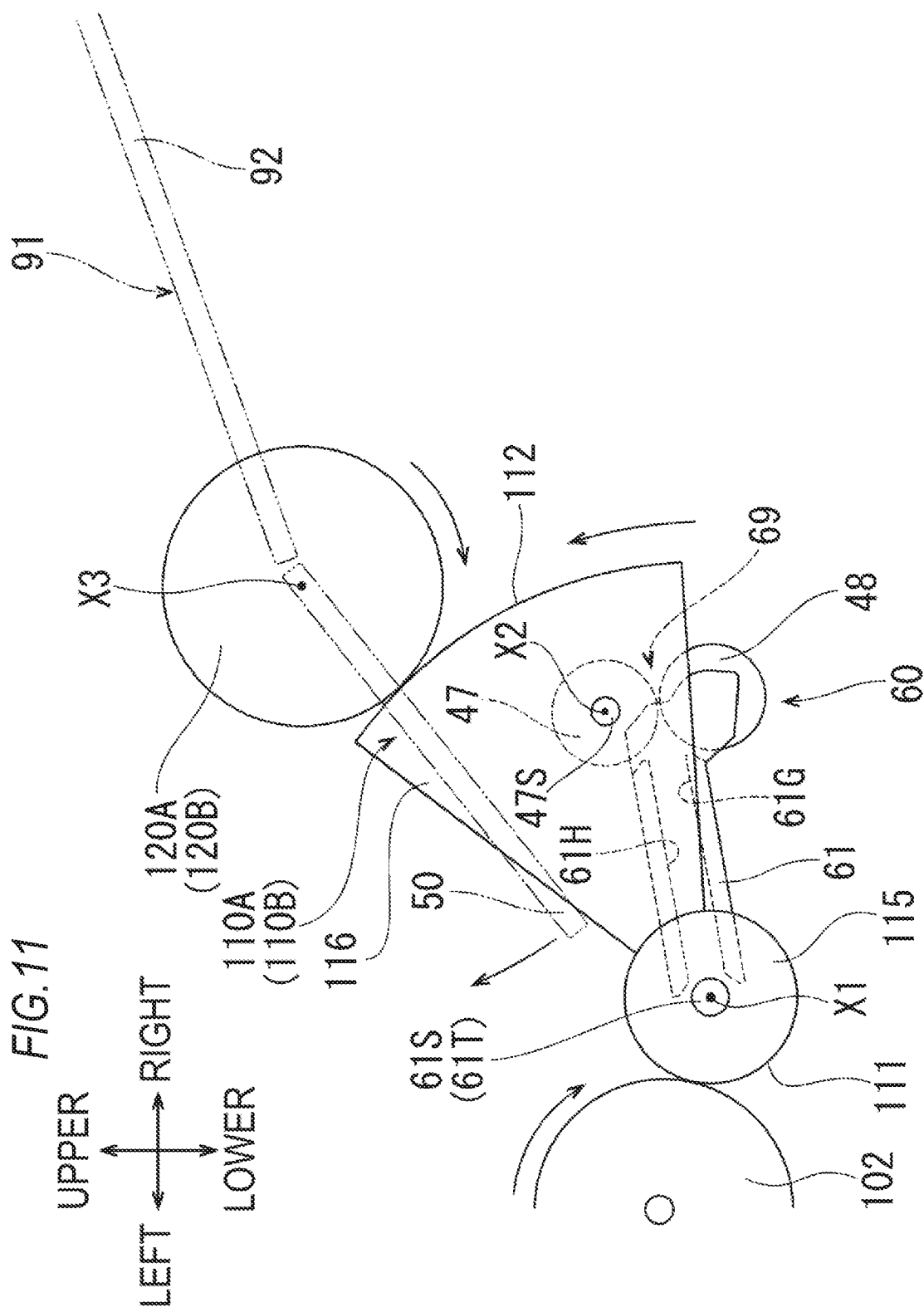
FIG. 11 is a schematic diagram same as that of FIG. 9 and is a diagram illustrating a state where the movable plate is positioned at a first position and the discharge unit is positioned at a third position in an image reading apparatus according to a second embodiment.
Figure 12:
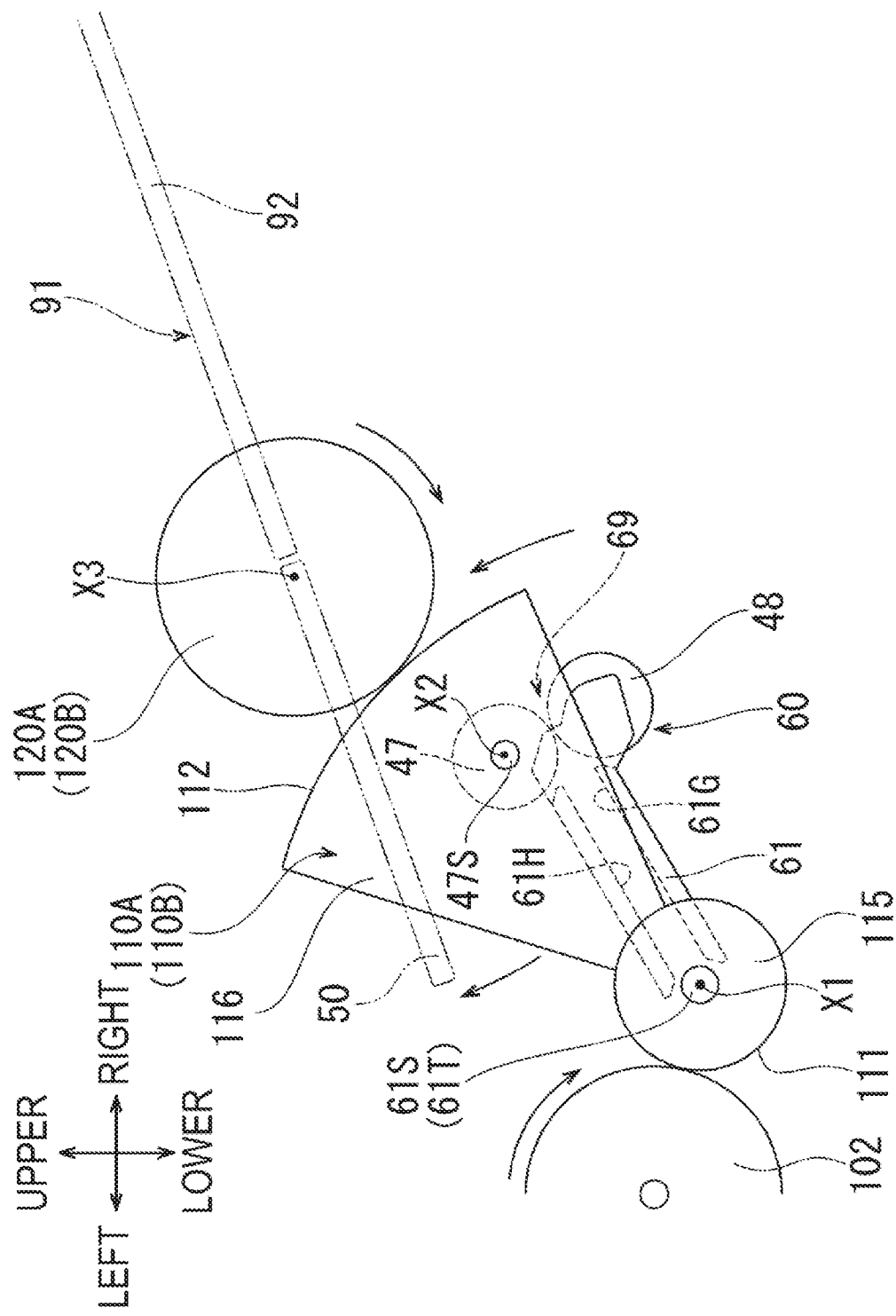
FIG. 12 is a schematic diagram same as that of FIG. 11 and is a diagram illustrating a state where the movable plate is moved to a second position and the discharge unit is moved to a fourth position.

In the image reading apparatus of a second embodiment, as illustrated in FIGS. 11 and 12, the first position and the second position of the movable plate 50 are changed in such a manner that an engagement position of the gear teeth of the second transmission gears 120A and 120B with respect to the fan shaped gear teeth 112 of the first transmission gears 110A and 110B is changed from the first embodiment.

Other configurations of the second embodiment are the same as those of the first embodiment. Therefore, the same reference signs are denoted to the same configurations as those of the first embodiment and descriptions thereof will be omitted or simplified.

As illustrated in FIG. 11, in a state where the movable plate 50 is at the first position, the downward inclination angle of the upper surface of the movable plate 50 is larger than the downward inclination angle of the upper surface of the supply tray main body 92. On the other hand, as illustrated in FIG. 12, in a state where the movable plate 50 is at the second position, the downward inclination angle of the upper surface of the movable plate 50 is approximately the same as the downward inclination angle of the upper surface of the supply tray main body 92.

Although illustration is omitted, a relative position relationship between the regulation surface 35K of the first chute member 35 and the movable plate 50 is also changed in accordance with the change of the first position and the second position of the movable plate 50. Specifically, in the state where the movable plate 50 is at the first position illustrated in FIG. 11, the left end part of the movable plate 50 is opposite to the lower end part of the regulation surface 35K. On the other hand, in the state where the movable plate 50 is at the second position illustrated in FIG. 12, the left end part of the movable plate 50 is opposite to the upper end part of the regulation surface 35K.

In the same manner as that of the image reading apparatus 1 according to the first embodiment, the image reading apparatus including the above-mentioned configuration according to the second embodiment not only can achieve the miniaturization in the up and down direction, but also can prevent the deterioration in the reading accuracy of the reading sensor 3S.

Third Embodiment

Figure 13:
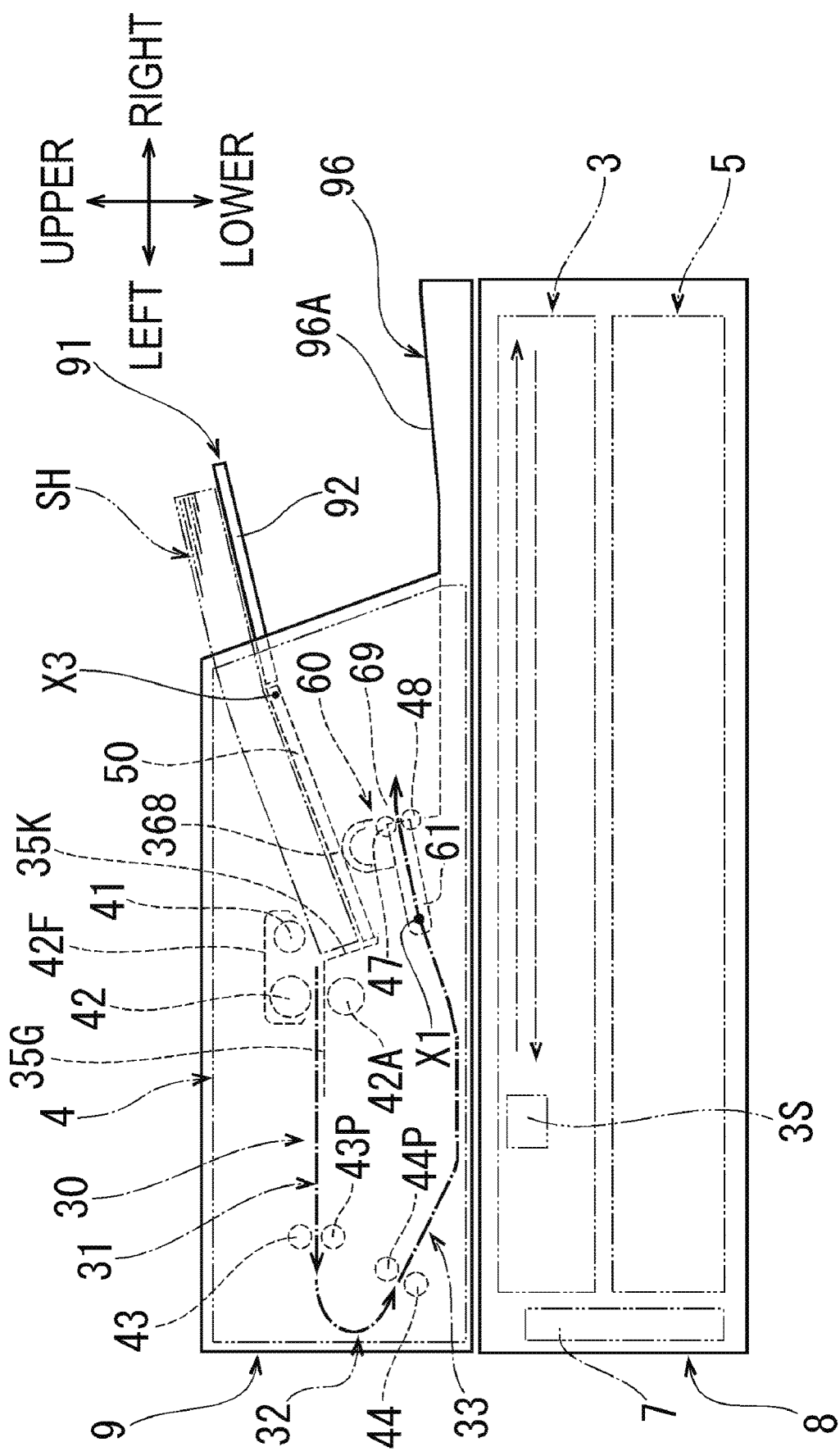
FIG. 13 is a schematic front view illustrating an image reading apparatus according to a third embodiment.
Figure 14:
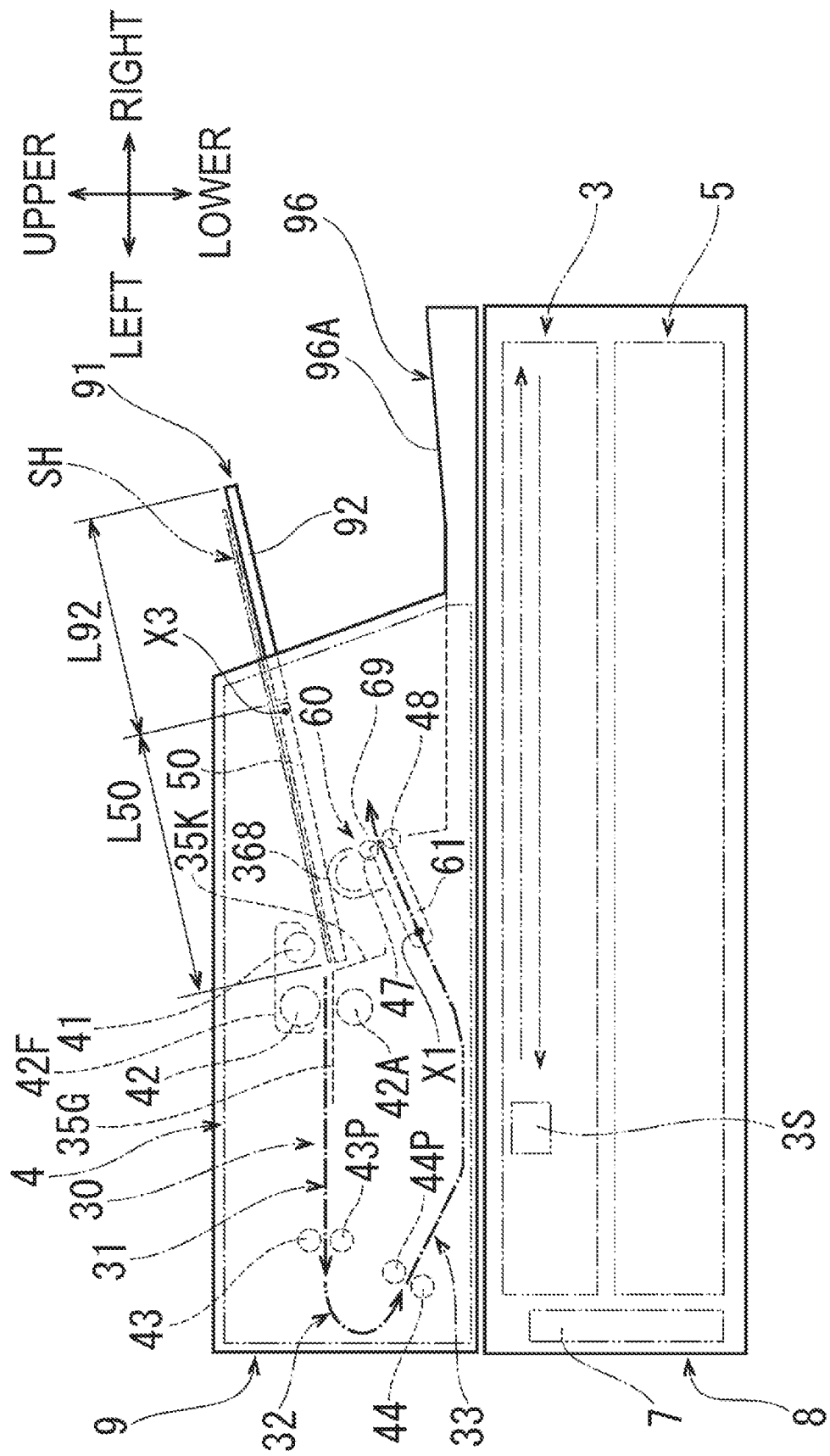
FIG. 14 is a schematic front view illustrating the image reading apparatus according to the third embodiment.
Figure 15:
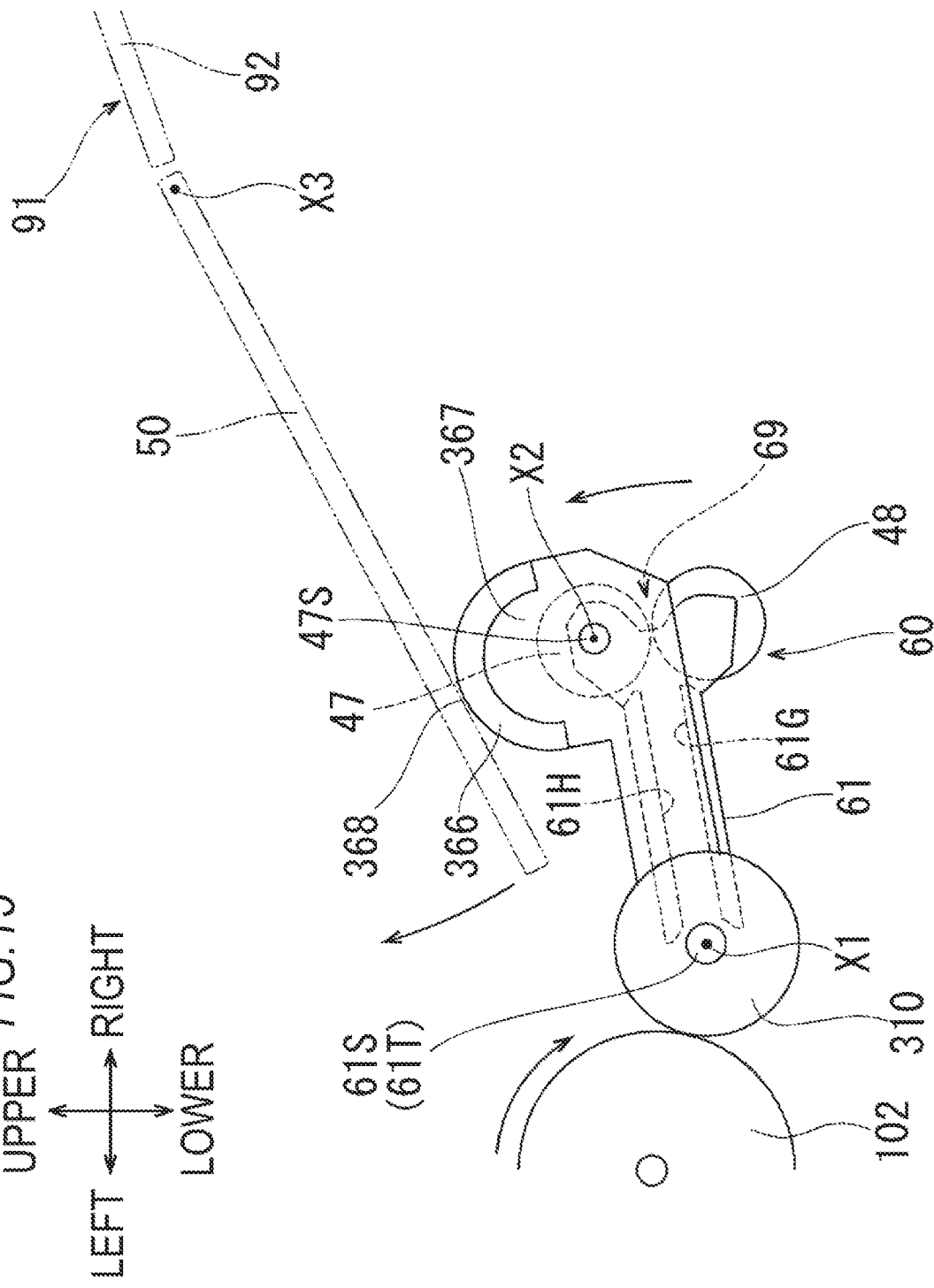
FIG. 15 is a schematic diagram same as that of FIG. 9 in the image reading apparatus according the third embodiment and is a diagram illustrating a state in which the movable plate is disposed at a first position and the discharge unit is disposed at a third position.

As illustrated in FIGS. 13 to 16, in an image reading apparatus of a third embodiment, the position of the third axis X3 according to the first embodiment is moved to the right side and as illustrated in FIG. 14, a length L50 of the movable plate 50 in the supply tray 91 is changed to be longer than a length L92 of a supply tray 92. Further, in the image reading apparatus, as illustrated in FIG. 15, the first transmission gears 110A and 110B and the second transmission gears 120A and 120B according to the first embodiment are eliminated and a transmission gear 310 and a pressing surface 368 are provided instead. The rotation shaft 47S of the discharge roller 47 is changed to be rotatably supported by the discharge guide 61.

Other configurations of the third embodiment are the same as those of the first embodiment. Therefore, the same reference signs are denoted to the same configurations as those of the first embodiment and descriptions thereof will be omitted or simplified.

In a state where the movable plate 50 is positioned at a first position illustrated in FIGS. 13 and 15, the downward inclination angle of the upper surface of the movable plate 50 is larger than the downward inclination angle of the upper surface of the supply tray main body 92. At this time, since the length L50 of the movable plate 50 is longer than the length L92 of the supply tray 92, even when the sheet SH supported by the supply tray 91 is stiff by curling or the like, the sheet SH hangs down by the own weight and is easy to follow along the bent portion of the supply tray main body 92 and the movable plate 50 and therefore the sheet SH is prevented from floating up with respect to the movable plate 50. On the other hand, in a state where the movable plate 50 is at a second position illustrated in FIGS. 14 and 16, the downward inclination angle of the upper surface of the movable plate 50 is approximately the same as the downward inclination angle of the upper surface of the supply tray main body 92.

As illustrated in FIG. 15, the transmission gear 310 is integrally and rotatably fixed to the front shaft unit 61S of the discharge guide 61 and is engaged with the gear 102.

A pressing protruding unit 367 is formed at a right end part of the discharge guide 61 to protrude upward. A sliding member 366 having a semi-circular arc shape in a side view is fixed to an upper end of the pressing protruding unit 367. The sliding member 366 is formed by a material which has a better sliding property than that of a material forming the movable plate 50. The material forming the sliding member 366 is, for example, a polyacetal resin (POM) and the like.

The pressing surface 368 is an outer peripheral surface of the sliding member 366 and abuts on a rear surface of the movable plate 50 from below.

When the first drive source M1 is operated such that the gear 102 rotates clockwise in FIG. 15, the drive force from the first drive source M1 is transmitted to the transmission gear 310 and thus the discharge unit 60 rotates around the first axis X1 to displace the discharge opening 69 upward and then moves from the third position illustrated in FIG. 15 and the like to the fourth position illustrated in FIG. 16 and the like.

At the same time, the pressing surface 368 pushes up the movable plate 50. As a result, as illustrated in FIG. 15, the movable plate 50 is driven by the discharge unit 60 and rotates around the third axis X3 to displace the left end part thereof upward, thereby moving from the first position illustrated in FIG. 15 and the like to the second position illustrated in FIG. 16 and the like.

When the first drive source M1 is operated such that the gear 102 rotates counter-clockwise in FIG. 16, the transmission gear 310 and the pressing surface 368 are operated in a direction opposite to the above-mentioned operation. As a result, as illustrated in FIG. 15, the discharge unit 60 moves to the third position and the movable plate 50 is driven by the discharge unit 60, thereby moving to the first position. At this time, since the movable plate 50 only abuts on the pressing surface 368 by the own weight thereof, it is possible to prevent the self-lock which may occur when the movable plate 50 and the discharge unit 60 are connected to each other by a link.

In the same manner as that of the image reading apparatus 1 according to the first and second embodiments, the image reading apparatus including the above-mentioned configuration according to the third embodiment not only can achieve the miniaturization in the up and down direction, but also can prevent the deterioration in the reading accuracy of the reading sensor 3S.

As described above, this disclosure is described according to the first to third embodiments, but this disclosure is not limited thereto and it goes without saying that this disclosure can be applied by being appropriately modified within the scope not deviated from the gist thereof.

In the first to third embodiments, the movable plate 50 is configured to rotate, but is not limited to this configuration and for example, the movable plate 50 may be linearly moved. The same also applies to the discharge unit.

For example, this disclosure can be used for an image reading apparatus, a multifunction machine and the like.

What is claimed is:

1. An image reading apparatus, comprising:
   a supply tray, which supports sheets to be supplied and includes a movable plate configured to move from a first position to a second position as a number of sheets supported by the supply tray decreases, the second position being higher than the first position;
   a discharge tray, which is positioned below the supply tray to support a sheet to be discharged;
   a conveyance guide, which conveys the sheet from the supply tray to the discharge tray;
   a reading sensor, which reads an image on the sheet to be conveyed on the conveyance guide;
   a discharger, which includes a discharge opening to discharge the sheet conveyed by the conveyance guide to the discharge tray and is configured to move from a third position to a fourth position as the number of sheets supported by the supply tray decreases, the fourth position being higher than the third position; and
   a first drive source, which generates a drive force,
   wherein in response to receiving the drive force from the first drive source, the discharger is moved between the third position and the fourth position, and in response to receiving the drive force via the discharger, the movable plate is moved between the first position and the second position.

2. The image reading apparatus according to claim 1, wherein the discharger includes a pressing surface, which is configured to be in contact with the movable plate to push up the movable plate.

3. The image reading apparatus according to claim 1, wherein
   the discharger includes a discharge roller and is rotatable around a first axis,
   the image reading apparatus further includes:
       a first transmission gear, which is rotatable around the first axis together with the discharger and transmits the drive force from the first drive source to the movable plate;
       a second drive source, which is provided separately from the first drive source and generates a drive force;
       a first discharge roller drive gear, which receives the drive force from the second drive source and is rotatable around the first axis independently from the first transmission gear; and
       a second discharge roller drive gear, which is engaged with the first discharge roller drive gear and is rotatable around a second axis, which is parallel with the first axis, together with a rotation shaft of the discharge roller, and
   the first transmission gear supports the rotation shaft of the discharge roller to be rotatable around the second axis while maintaining the first axis and the second axis at a predetermined interval.

4. The image reading apparatus according to claim 3, wherein the first transmission gear has a fan shape.

5. The image reading apparatus according to claim 3, wherein the movable plate is rotatable around a third axis, which is parallel with the first axis.

6. The image reading apparatus according to claim 5, further comprising:
   a second transmission gear, which receives the drive force from the first drive source by the first transmission gear and is rotatable around the third axis together with the movable plate.

7. The image reading apparatus according to claim 3, wherein
   the discharger is rotatable around the first axis and includes a discharge guide which guides the sheet toward the discharge roller; and
   the first axis is positioned at an intermediate part between the reading sensor and the discharge opening in a discharge direction in which the sheet is discharged to the discharge tray.

8. The image reading apparatus according to claim 3, wherein
   the conveyance guide includes:
       a first guide, which guides the sheet sent out from the supply tray;
       a second guide, which is connected to the first guide and changes a conveyance direction of the sheet in a reverse direction; and
       a third guide, which is connected to the second guide and guides the sheet toward the discharge tray, and
   the second drive source is positioned between the first guide and the third guide.

9. The image reading apparatus according to claim 3, wherein the first transmission gear is provided at both one side and the other side in an axial direction of the discharge roller.

10. The image reading apparatus according to claim 9, further comprising:
    a first side frame and a second side frame, which are opposite to each other to sandwich the conveyance guide in the axial direction of the discharge roller, wherein
    the first drive source is supported by the first side frame, and
    the second drive source is supported by the second side frame.

11. The image reading apparatus according to claim 1, wherein
    the conveyance guide includes:
        a first guide, which guides the sheet sent out from the supply tray;
        a second guide, which is connected to the first guide and changes a conveyance direction of the sheet in a reverse direction; and
        a third guide, which is connected to the second guide and guides the sheet toward the discharge tray, and
    the first drive source is positioned between the first guide and the third guide.

12. The image reading apparatus according to claim 1, wherein
   in a state where the discharger is positioned in the third position, the movable plate is positioned in the first position, and
   in a state where the discharger is positioned in the fourth position, the movable plate is positioned in the second position.

* * * * *